US012762376B2

(12) United States Patent
Williams et al.

(10) Patent No.: US 12,762,376 B2
(45) Date of Patent: Oct. 13, 2026

(54) GENERATIVE ARTIFICIAL INTELLIGENCE AS A PERSONAL TASK GENERATOR TO COMPLETE OBJECTIVES

(71) Applicant: STATE FARM MUTUAL AUTOMOBILE INSURANCE COMPANY, Bloomington, IL (US)

(72) Inventors: Aaron Williams, Congerville, IL (US); Joseph Harr, Bloomington, IL (US); Scott T. Christensen, Salem, OR (US); Ryan M. Gross, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 588 days.

(21) Appl. No.: 18/216,281

(22) Filed: Jun. 29, 2023

(65) Prior Publication Data

US 2024/0330654 A1 Oct. 3, 2024

Related U.S. Application Data

(60) Provisional application No. 63/463,389, filed on May 2, 2023, provisional application No. 63/456,713, filed on Apr. 3, 2023.

(51) Int. Cl.
*G06N 3/04* (2023.01)
*G06N 3/045* (2023.01)
(Continued)

(52) U.S. Cl.
CPC ............... *G06N 3/045* (2023.01); *G06N 3/09* (2023.01); *G06Q 40/06* (2013.01); *G06Q 40/084* (2025.08)

(58) Field of Classification Search
CPC .......... G06N 3/045; G06N 3/09; G06Q 40/06; G06Q 40/08; G06Q 40/084
See application file for complete search history.

(56) References Cited

U.S. PATENT DOCUMENTS 7,523,060 B1 4/2009 Tenorio
8,682,804 B1 3/2014 Yoon
(Continued)

FOREIGN PATENT DOCUMENTS

CN 110175229 A 8/2019
CN 114742657 A 7/2022
(Continued)

OTHER PUBLICATIONS

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-agent-m-generative-ai-llm>. Retrieved from Internet on Aug. 1, 2023.
(Continued)

*Primary Examiner* — Scott C Anderson
(74) *Attorney, Agent, or Firm* — MARSHALL, GERSTEIN & BORUN LLP

(57) ABSTRACT

A computer system for personalized planning may include one or more processors configured to: receive from a user a request for personalized assistance with an objective, send an identification of the user and a prompt for the personalized assistance with the objective to an ML chatbot (or voice bot) to cause an ML model to divide the objective into one or more discrete steps and generate personalized instructions for performing the one or more discrete steps, receive the personalized instructions for performing the one or more discrete steps from the ML chatbot (or voice bot), and
(Continued)

communicate the personalized instructions for performing the one or more discrete steps to the user.

20 Claims, 8 Drawing Sheets

(51) Int. Cl.

| | |
|---|---|
| ***G06N 3/09*** | (2023.01) |
| ***G06Q 40/06*** | (2012.01) |
| ***G06Q 40/08*** | (2012.01) |

(56) References Cited

U.S. PATENT DOCUMENTS

| | | | | |
|---|---|---|---|---|
| 9,270,711 | B1 | 2/2016 | Rowland et al. | |
| 10,107,708 | B1 | 10/2018 | Schick et al. | |
| 10,409,995 | B1 | 9/2019 | Wasiq et al. | |
| 10,733,383 | B1 | 8/2020 | Shah et al. | |
| 11,017,466 | B1 | 5/2021 | Cunningham et al. | |
| 11,238,521 | B2 | 2/2022 | Malkiel et al. | |
| 11,270,331 | B1 | 3/2022 | Breitweiser et al. | |
| 11,314,846 | B1 | 4/2022 | Colin et al. | |
| 11,444,893 | B1 | 9/2022 | Kalluri | |
| 11,538,112 | B1 * | 12/2022 | Singh | G06Q 10/10 |
| 11,593,685 | B1 | 2/2023 | Chan et al. | |
| 11,595,243 | B1 | 2/2023 | Schreiber et al. | |
| 11,645,253 | B1 | 5/2023 | Xing et al. | |
| 11,676,202 | B1 | 6/2023 | Latronico et al. | |
| 11,726,889 | B1 | 8/2023 | Rao et al. | |
| 11,763,148 | B2 | 9/2023 | Milman et al. | |
| 11,769,013 | B2 | 9/2023 | Machado et al. | |
| 11,803,849 | B1 | 10/2023 | Lawrence | |
| 11,900,451 | B1 | 2/2024 | King et al. | |
| 11,929,963 | B1 | 3/2024 | Zheng | |
| 11,942,079 | B2 | 3/2024 | Chun et al. | |
| 11,989,636 | B1 * | 5/2024 | Leeds | G06N 3/006 |
| 12,181,844 | B2 | 12/2024 | Ramanasankaran et al. | |
| 2006/0195335 | A1 | 8/2006 | Christian et al. | |
| 2007/0088588 | A1 | 4/2007 | Schaffer | |
| 2007/0233535 | A1 * | 10/2007 | Kim | G06Q 10/063114 705/7.17 |
| 2008/0196099 | A1 | 8/2008 | Shastri | |
| 2008/0266382 | A1 | 10/2008 | Pederson et al. | |
| 2010/0161503 | A1 | 6/2010 | Foster | |
| 2012/0054040 | A1 | 3/2012 | Bagherjeiran et al. | |
| 2013/0151533 | A1 | 6/2013 | Udupa et al. | |
| 2013/0191223 | A1 | 7/2013 | Harris et al. | |
| 2015/0128246 | A1 | 5/2015 | Feghali et al. | |
| 2016/0156574 | A1 | 6/2016 | Hum et al. | |
| 2016/0196511 | A1 | 7/2016 | Anisingaraju et al. | |
| 2016/0260033 | A1 | 9/2016 | Keyngnaert et al. | |
| 2016/0379284 | A1 | 12/2016 | Alizadeh et al. | |
| 2017/0075877 | A1 | 3/2017 | Lepeltier | |
| 2017/0353991 | A1 | 12/2017 | Tapia | |
| 2018/0013783 | A1 | 1/2018 | Anachi | |
| 2018/0048595 | A1 | 2/2018 | Dotan et al. | |
| 2018/0090137 | A1 | 3/2018 | Horling et al. | |
| 2018/0121657 | A1 | 5/2018 | Hay et al. | |
| 2018/0121808 | A1 | 5/2018 | Ramakrishna et al. | |
| 2018/0150739 | A1 | 5/2018 | Wu | |
| 2018/0189739 | A1 | 7/2018 | Kenthapadi et al. | |
| 2018/0253780 | A1 | 9/2018 | Wang et al. | |
| 2019/0005024 | A1 | 1/2019 | Somech et al. | |
| 2019/0087865 | A1 | 3/2019 | Loree et al. | |
| 2019/0089725 | A1 | 3/2019 | Anachi | |
| 2019/0114395 | A1 | 4/2019 | Lenchner et al. | |
| 2019/0122232 | A1 | 4/2019 | Leidi et al. | |
| 2019/0141058 | A1 | 5/2019 | Hassanzadeh et al. | |
| 2019/0228099 | A1 | 7/2019 | Bajaj et al. | |
| 2019/0303798 | A1 | 10/2019 | Xie et al. | |
| 2020/0012958 | A1 | 1/2020 | Natanson et al. | |
| 2020/0053117 | A1 * | 2/2020 | Mandal | H04L 63/1433 |
| 2020/0133756 | A1 | 4/2020 | Sun et al. | |
| 2020/0184017 | A1 | 6/2020 | Batra et al. | |
| 2020/0258045 | A1 | 8/2020 | Knupfer | |
| 2020/0259700 | A1 | 8/2020 | Bhalla et al. | |
| 2020/0259701 | A1 | 8/2020 | Povoa | |
| 2020/0272994 | A1 | 8/2020 | Silveira et al. | |
| 2020/0327172 | A1 | 10/2020 | Coquard et al. | |
| 2020/0334580 | A1 | 10/2020 | Sheopuri et al. | |
| 2020/0342032 | A1 | 10/2020 | Subramaniam et al. | |
| 2020/0372823 | A1 | 11/2020 | Edwards et al. | |
| 2021/0021636 | A1 | 1/2021 | Sbandi | |
| 2021/0056007 | A1 | 2/2021 | Viswanathan et al. | |
| 2021/0081819 | A1 | 3/2021 | Polleri et al. | |
| 2021/0083994 | A1 | 3/2021 | Pan et al. | |
| 2021/0133807 | A1 | 5/2021 | Kini et al. | |
| 2021/0141862 | A1 | 5/2021 | Huang et al. | |
| 2021/0166244 | A1 | 6/2021 | Basam | |
| 2021/0232613 | A1 | 7/2021 | Raval et al. | |
| 2021/0249017 | A1 | 8/2021 | Burris et al. | |
| 2021/0312561 | A1 * | 10/2021 | Speasl | G06F 21/602 |
| 2021/0326757 | A1 | 10/2021 | Rawat et al. | |
| 2021/0342918 | A1 | 11/2021 | Price et al. | |
| 2021/0342946 | A1 | 11/2021 | Leise et al. | |
| 2021/0349955 | A1 | 11/2021 | Megill et al. | |
| 2021/0374168 | A1 | 12/2021 | Srinivasan et al. | |
| 2022/0004479 | A1 | 1/2022 | Mccawley et al. | |
| 2022/0012357 | A1 | 1/2022 | Rajeev | |
| 2022/0019496 | A1 | 1/2022 | Lozano et al. | |
| 2022/0094649 | A1 | 3/2022 | Le | |
| 2022/0107858 | A1 | 4/2022 | Jain et al. | |
| 2022/0114340 | A1 | 4/2022 | Graeser et al. | |
| 2022/0129261 | A1 | 4/2022 | Cabrera et al. | |
| 2022/0138161 | A1 | 5/2022 | Anjum et al. | |
| 2022/0138690 | A1 | 5/2022 | Anjum et al. | |
| 2022/0148113 | A1 | 5/2022 | Mejia et al. | |
| 2022/0156298 | A1 | 5/2022 | Mahmoud et al. | |
| 2022/0229860 | A1 | 7/2022 | Ship et al. | |
| 2022/0229978 | A1 | 7/2022 | Ship et al. | |
| 2022/0244847 | A1 | 8/2022 | Margot et al. | |
| 2022/0261711 | A1 | 8/2022 | Krishna et al. | |
| 2022/0270120 | A1 | 8/2022 | King | |
| 2022/0308943 | A1 | 9/2022 | Srinivasan et al. | |
| 2022/0351281 | A1 * | 11/2022 | Morgan | G06Q 30/0633 |
| 2022/0358225 | A1 | 11/2022 | Gadde et al. | |
| 2022/0374483 | A1 | 11/2022 | Hunt | |
| 2022/0374598 | A1 | 11/2022 | Osuala et al. | |
| 2022/0398492 | A1 | 12/2022 | Navon et al. | |
| 2022/0400159 | A1 | 12/2022 | Chi et al. | |
| 2023/0018065 | A1 | 1/2023 | Schmitt et al. | |
| 2023/0033680 | A1 | 2/2023 | Whatley | |
| 2023/0074406 | A1 | 3/2023 | Baeuml et al. | |
| 2023/0080589 | A1 | 3/2023 | Gupta et al. | |
| 2023/0080724 | A1 | 3/2023 | Stoops et al. | |
| 2023/0092334 | A1 | 3/2023 | Vendrow | |
| 2023/0092651 | A1 | 3/2023 | Joshi et al. | |
| 2023/0099424 | A1 | 3/2023 | Hawkinson et al. | |
| 2023/0110941 | A1 | 4/2023 | Makhija et al. | |
| 2023/0124948 | A1 | 4/2023 | Li et al. | |
| 2023/0135162 | A1 | 5/2023 | Cohen et al. | |
| 2023/0252342 | A1 | 8/2023 | Stewart et al. | |
| 2023/0273783 | A1 | 8/2023 | Molander et al. | |
| 2023/0297887 | A1 | 9/2023 | Gurgu et al. | |
| 2023/0316141 | A1 | 10/2023 | Toporek et al. | |
| 2023/0316339 | A1 | 10/2023 | Anderson et al. | |
| 2023/0367669 | A1 | 11/2023 | Tiwari et al. | |
| 2023/0379273 | A1 | 11/2023 | Yannam et al. | |
| 2023/0386657 | A1 | 11/2023 | Pascal et al. | |
| 2023/0396568 | A1 | 12/2023 | Lutsyshyn | |
| 2023/0401387 | A1 | 12/2023 | Alexander et al. | |
| 2023/0401660 | A1 | 12/2023 | Ambrosch et al. | |
| 2024/0037343 | A1 | 2/2024 | Miller et al. | |
| 2024/0037896 | A1 | 2/2024 | Zhang et al. | |
| 2024/0054430 | A1 | 2/2024 | Maikhuri et al. | |
| 2024/0061835 | A1 | 2/2024 | Subramanian et al. | |
| 2024/0144372 | A1 | 5/2024 | Wu et al. | |
| 2024/0169163 | A1 | 5/2024 | Nguyen | |
| 2024/0171480 | A1 | 5/2024 | Sheoran et al. | |
| 2024/0194180 | A1 | 6/2024 | Goldshtein et al. | |
| 2024/0202452 | A1 | 6/2024 | Schillace et al. | |
| 2024/0202457 | A1 | 6/2024 | Yogerst et al. | |
| 2024/0202571 | A1 | 6/2024 | Yaghi et al. | |
| 2024/0202572 | A1 | 6/2024 | Morales et al. | |

(56) References Cited

U.S. PATENT DOCUMENTS

| | | | |
|---|---|---|---|
| 2024/0211799 | A1 | 6/2024 | Mazor |
| 2024/0220674 | A1 | 7/2024 | Lopez et al. |
| 2024/0249318 | A1 | 7/2024 | Spiegel et al. |
| 2024/0256429 | A1 | 8/2024 | Lucioni et al. |
| 2024/0257209 | A1 | 8/2024 | Wang et al. |
| 2024/0267243 | A1 | 8/2024 | Ning et al. |
| 2024/0267344 | A1 | 8/2024 | Mulligan et al. |
| 2024/0281677 | A1 | 8/2024 | Mifflin |
| 2024/0281706 | A1 | 8/2024 | Marzinzik et al. |
| 2024/0283697 | A1 | 8/2024 | Bates-Maricle |
| 2024/0289113 | A1 | 8/2024 | Bates-Maricle |
| 2024/0289872 | A1 | 8/2024 | Fields et al. |
| 2024/0291777 | A1 | 8/2024 | Fields et al. |
| 2024/0291778 | A1 | 8/2024 | Fields et al. |
| 2024/0291779 | A1 | 8/2024 | Catalano et al. |
| 2024/0291785 | A1 | 8/2024 | Fields et al. |
| 2024/0296489 | A1 | 9/2024 | Brannan |
| 2024/0311618 | A1 | 9/2024 | Sukhavasi et al. |
| 2024/0330151 | A1 | 10/2024 | Williams et al. |
| 2024/0330455 | A1 | 10/2024 | Sahu |
| 2024/0330504 | A1 | 10/2024 | Williams et al. |
| 2024/0331043 | A1 | 10/2024 | Williams et al. |
| 2024/0333728 | A1 | 10/2024 | Williams et al. |
| 2024/0333746 | A1 | 10/2024 | Williams et al. |
| 2024/0394503 | A1 | 11/2024 | Gutierrez et al. |
| 2024/0394593 | A1 | 11/2024 | Gutierrez et al. |
| 2024/0403566 | A1 | 12/2024 | Sengupta et al. |
| 2024/0412145 | A1 | 12/2024 | Wheeler et al. |
| 2024/0412168 | A1 | 12/2024 | Shrader |
| 2024/0412313 | A1 | 12/2024 | Wheeler et al. |
| 2024/0428259 | A1 | 12/2024 | Wheeler et al. |
| 2024/0430702 | A1 | 12/2024 | Chandran et al. |
| 2025/0022071 | A1 | 1/2025 | Gutierrez et al. |
| 2025/0029192 | A1 | 1/2025 | Wheeler et al. |

FOREIGN PATENT DOCUMENTS

| | | | |
|---|---|---|---|
| JP | 2019-514117 | A | 5/2019 |
| KR | 10-2023-0018065 | A | 2/2023 |
| KR | 10-2619905 | B1 | 1/2024 |
| WO | 2020/198392 | A1 | 10/2020 |
| WO | 2021/092164 | A1 | 5/2021 |
| WO | 2024/112887 | A1 | 5/2024 |

OTHER PUBLICATIONS

Limra, Should Financial Services Companies Consider Open AI? Web page downloaded from Internet at <https://www.limra.com/en/trending-topics/publications/marketfacts/2023/should-financial-services-companies-consider-open-ai>. Retrieved from Internet on Apr. 28, 2023.

Financial Times, "Insurer Zurich experiments with ChatGPT for claims and data mining" Web page downloaded from Internet at <https://www.ft.com/content/45e5525c-ac45-4a49-a55c-8833d1a036b9 >. Retrieved from internet on Apr. 25, 2023.

Ignites, "Morgan Stanley Developing Chatbot with OpenAI" Web page downloaded from the Internet at <https://www.ignites.com/pc/3979274/514654?all=true>. Retrieved from Internet on Apr. 25, 2023.

Ignites, "The Compliance Tasks Chat GPT Can (and Can't) Handle" Web page downloaded from the Internet at <https://www.ignites.com/pc/4002214/518634?all=true>. Retrieved from the Internet on Apr. 25, 2023.

Life Annuity Specialist, "What ChatGPT's Chores May Look Like in Life Insurance Industry" Web page downloaded from the Internet at <https://www.lifeannuityspecialist.com/pc/4031524/521574?all=true>. Retrieved from the Internet on Apr. 25, 2023.

Panjaitan, Hapizin Yonani, and Renny Risqiani. "Antecedents of Customer Satisfaction Towards Chatbot on Used Car Buying and Selling Platforms in Indonesia." APMBA (Asia Pacific Management and Business Application) 12.3 (2024): 315-334.

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

Introducing Agent M—a powerful Large Language model or ChatGPT based Master Agent developer framework, powered by Floatbot platform, that lets you create multiple application-specific LLM-based Agent(s). Retrieved from the internet at: <URL:https://www.linkedin.com/posts/jimmypadia_nyse-floor-talk- floatbot-activity-7089664064603234304- 60TU?utm source=share&utm medium=member android> (2023).

Unknown, "GPT-3 vs GPT-4 | What's the difference?", Jan. 2023, botpress.com, web.archive.org/web/20230131033431/https://botpress.com/blog/gpt-3-vs-gpt-4-whats-the-difference (Year: 2023).

Anonymous, Roots Automation Introduces InsurGPT—the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Munk, Will AI models like ChatGPT take your insurance job?, Life Annuity Speciality (published Mar. 7, 2023).

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

Arshad, et al. "VocaVisionary: A Career Guidance Chatbot." 2024 Second International Conference on Advances in Information Technology (ICAIT). vol. 1. IEEE, 2024. (Year: 2024).

Ouyang et al., Training language models to follow instructions with human feedback, Cornell University (Mar. 4, 2022).

Prakash, Sajay, Koushik Sundar, and Eashaan Manohar. "Career Connect—A Personalized Job Recommendation AI Chatbot." (2024). (Year: 2024).

Yager, "Domain-Specific chatbots for science using embeddings", Jun. 2023, Royal Society of Chemistry, pp. 1-12, downloaded from https://pubs.rsc.org/en/content/articlepdf/2023/dd/d3dd00112a, D0I:10.1039/D3DD00112A (Year: 2023).

Bodea, Constanta-Nicoleta, Maria-Iuliana Dascalu, and Alexandru Hang. "Chatbot-based training for project management: . . ." Research on project, programme and portfolio management: Integrating sustainability into project management. Springer International Publishing, 2021. (Year: 2021).

Casillo et al. "Chatbot in industry 4.0: An approach for training new employees." 2020 IEEE International Conference on Teaching, Assessment, and Learning for Engineering (TALE). IEEE, 2020. (Year: 2020).

Clarizia et al. "E-learning and industry 4.0: A chatbot for training employees." Proceedings of Fifth International Congress on Information and Communication Technology: ICICT 2020, London, vol. 2. Springer Singapore, 2021. (Year: 2021).

Dovetail Software. "The Ultimate Guide to Conversational AI Chatbots for HR." Dovetail Software Blog, Mar. 12, 2022 (last accessed on Jul. 8, 2025 at https://blog.dovetailsoftware.com/hr/ultimate-guide-to-ai-chatbots-for-hr). (Year: 2022).

English language translation of above-mentioned CN Pat. App. Pub. No. 110175229 A to Chen et al. (Year: 2019).

Grensing-Pophal, Lin. "How HR Is Using Virtual Chat and Chatbots." SHRM News, May 24, 2022 (last accessed on Jul. 8, 2025 at https://www.shrm.org/topics-tools/news/technology/how-hr-using-virtual-chat-chatbots). (Year: 2022).

Nguyen et al., "Deep Learning and Handheld Augmented Reality Based System for Optimal Data Collection in Fault Diagnostics Domain." arXiv preprint arXiv:2206.07772 (2022). (Year: 2022).

Shao, "Communication Fault Diagnosis Algorithm Based on BP Neural Network" 2021 3rd International Conference on Intelligent Control, Measurement and Signal Processing and Intelligent Oil Field (ICMSP), Xi'an, China, 2021, pp. 239-243, doi: 10.1109/ICMSP53480.2021.9513359. (Year: 2021).

(56) References Cited

OTHER PUBLICATIONS

Suresh et al. "Career counseling chatbot on Facebook messenger using AI." Proceedings of the International Conference on Data Science, Machine Learning and Artificial Intelligence. 2021. (Year: 2021).
JP 2019514117A (Machine translation); 2025 (Year: 2025).

* cited by examiner

GENERATIVE ARTIFICIAL INTELLIGENCE AS A PERSONAL TASK GENERATOR TO COMPLETE OBJECTIVES

CROSS-REFERENCE TO RELATED APPLICATIONS

This application claims priority to and the benefit of the filing date of provisional U.S. Patent Application No. 63/456,713 entitled "GENERATIVE ARTIFICIAL INTELLIGENCE AS A PERSONAL PLANNER," filed on Apr. 3, 2023, and provisional U.S. Patent Application No. 63/463,389 entitled "GENERATIVE ARTIFICIAL INTELLIGENCE AS A PERSONAL PLANNER," filed on May 2, 2023, the entire contents of both applications is hereby expressly incorporated herein by reference.

FIELD OF THE INVENTION

The present disclosure generally relates to a personal task generator to complete objectives, such as an automated investment advising system.

BACKGROUND

Individuals may set objectives for themselves, but often may have difficulty accomplishing those objectives. Individuals may not know what tasks and/or steps may be required to accomplish an objective. Conventional information sources, such as books, may not include information about accomplishing objectives that may be personalized for the individual.

Individuals or organizations may have an investment strategy and/or financial objective but may have difficulty implementing that investment strategy. Conventional financial planners may charge a high fee for investment services, may not act in the individual's or organization's best interest, and/or may not implement the investment strategy effectively.

The conventional task planning and financial planning techniques may include additional shortcomings, inefficiencies, encumbrances, ineffectiveness, and/or other drawbacks.

SUMMARY

The present embodiments may relate to, inter alia, systems and methods for personal task generation to complete objectives using machine learning (ML) and/or artificial intelligence (AI).

In one aspect, computer-implemented method for personalized planning using ML may be provided. The computer-implemented method may be implemented via one or more local or remote processors, servers, transceivers, sensors, memory units, mobile devices, wearables, fitness trackers, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer-implemented method may include: (1) receiving from a user a request for personalized assistance with an objective; (2) sending an identification of the user and a prompt for the personalized assistance with the objective to an ML chatbot (or voice bot) to cause an ML model to divide the objective into one or more discrete steps and generate personalized instructions for performing the one or more discrete steps; (3) receiving the personalized instructions for performing the one or more discrete steps from the ML chatbot (or voice bot); and/or (4) communicating the personalized instructions for performing the one or more discrete steps to the user. The method may include additional, less, or alternate functionality or actions, including those discussed elsewhere herein.

In another aspect, a computer system for personalized planning using ML may be provided. The computer system may include one or more local or remote processors, servers, transceivers, sensors, memory units, mobile devices, wearables, fitness trackers, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer system may include one or more processors configured to: (1) receive from a user a request for personalized assistance with an objective; (2) send an identification of the user and a prompt for the personalized assistance with the objective to an ML chatbot (or voice bot) to cause an ML model to divide the objective into one or more discrete steps and generate personalized instructions for performing the one or more discrete steps; (3) receiving the personalized instructions for performing the one or more discrete steps from the ML chatbot (or voice bot); and/or (4) communicate the personalized instructions for performing the one or more discrete steps to the user. The computer system may include additional, less, or alternate functionality, including that discussed elsewhere herein.

In another aspect, a non-transitory computer-readable medium storing processor-executable instructions that, when executed by one or more processors, cause the one or more processors to: (1) receive from a user a request for personalized assistance with an objective; (2) send an identification of the user and a prompt for the personalized assistance with the objective to an ML chatbot (or voice bot) to cause an ML model to divide the objective into one or more discrete steps and generate personalized instructions for performing the one or more discrete steps; (3) receiving the personalized instructions for performing the one or more discrete steps from the ML chatbot (or voice bot); and/or (4) communicate the personalized instructions for performing the one or more discrete steps to the user. The instructions may direct additional, less, or alternate functionality, including that discussed elsewhere herein.

In one aspect, computer-implemented method for personalized planning using AI may be provided. The computer-implemented method may be implemented via one or more local or remote processors, servers, transceivers, sensors, memory units, mobile devices, wearables, fitness trackers, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer-implemented method may include: (1) receiving from a user a request for personalized assistance with an objective; (2) sending an identification of the user and a prompt for the personalized assistance with the objective to an AI chatbot (or voice bot) to cause an ML model to divide the objective into one or more discrete steps and generate personalized instructions for performing the one or more discrete steps; (3) receiving the personalized instructions for performing the one or more discrete steps from the AI chatbot (or voice bot); and/or (4) communicating the personalized instructions for performing the one or more discrete steps to the user. The method may include additional, less, or alternate functionality or actions, including those discussed elsewhere herein.

In another aspect, a computer system for personalized planning using AI may be provided. The computer system may include one or more local or remote processors, servers, transceivers, sensors, memory units, mobile devices, wearables, fitness trackers, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer system may include one or more processors configured to: (1) receive from a user a request for personalized assistance with an objective; (2) send an identification of the user and a prompt for the personalized assistance with the objective to an AI chatbot (or voice bot) to cause an ML model to divide the objective into one or more discrete steps and generate personalized instructions for performing the one or more discrete steps; (3) receiving the personalized instructions for performing the one or more discrete steps from the AI chatbot (or voice bot); and/or (4) communicate the personalized instructions for performing the one or more discrete steps to the user. The computer system may include additional, less, or alternate functionality, including that discussed elsewhere herein.

In another aspect, a non-transitory computer-readable medium storing processor-executable instructions that, when executed by one or more processors, cause the one or more processors to: (1) receive from a user a request for personalized assistance with an objective; (2) send an identification of the user and a prompt for the personalized assistance with the objective to an AI chatbot (or voice bot) to cause an ML model to divide the objective into one or more discrete steps and generate personalized instructions for performing the one or more discrete steps; (3) receiving the personalized instructions for performing the one or more discrete steps from the AI chatbot (or voice bot); and/or (4) communicate the personalized instructions for performing the one or more discrete steps to the user. The instructions may direct additional, less, or alternate functionality, including that discussed elsewhere herein.

Additional, alternate and/or fewer actions, steps, features and/or functionality may be included in one aspect and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Overview

The computer systems and methods disclosed herein generally relate to, inter alia, methods and systems for personalized planning and automated investment advising using machine learning (ML) and/or artificial intelligence (AI).

Some embodiments may include one or more of: (1) personalized task generator to complete objectives, and (2) automated investment advising.

Exemplary Computing Environment

Figure 1:
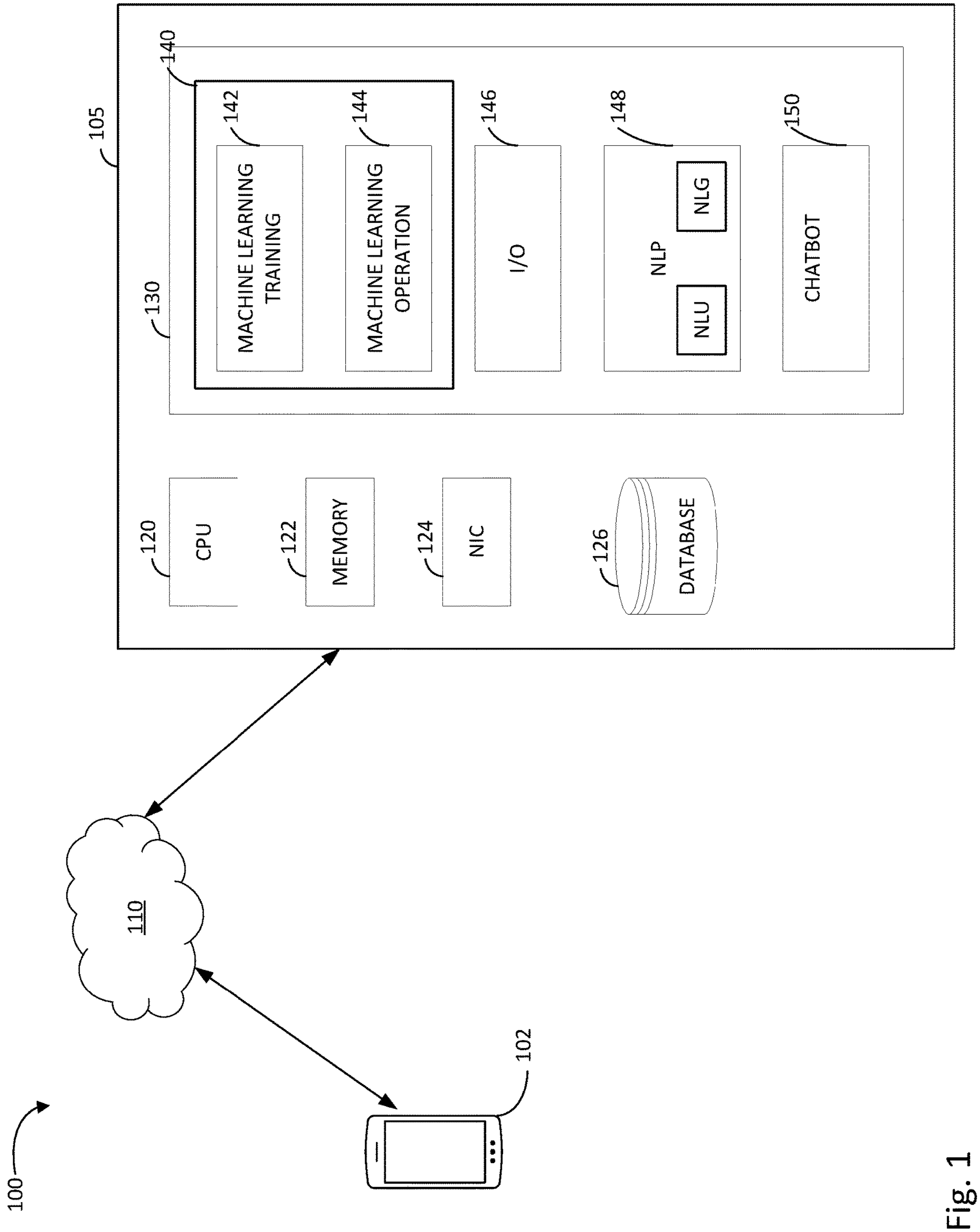
FIG. 1 depicts a block diagram of an exemplary computer system in which methods and systems for personal planning and/or automated investment advising are implemented.

FIG. 1 depicts an exemplary computing environment 100 in which methods and systems for personalized planning and automated investment may be performed, in accordance with various aspects discussed herein.

As illustrated, the computing environment 100 includes a client device 102. The computing environment 100 may further include an electronic network 110 communicatively coupling other aspects of the computing environment 100.

The client device 102 may be any suitable device and include one or more desktop computers, laptop computers, server computers, mobile devices, wearables, smart watches, smart contact lenses, smart glasses, AR glasses/headsets, virtual reality (VR) glasses/headsets, mixed or extended reality glasses/headsets, voice bots or chatbots, ChatGPT bots, displays, display screens, visuals, and/or other electronic or electrical component. The client device 102 may include a memory and a processor for, respectively, storing and executing one or more modules. The memory may include one or more suitable storage media such as a magnetic storage device, a solid-state drive, random access memory (RAM), etc. The client device 102 may access services or other components of the computing environment 100 via the network 110.

As described herein and in one aspect, one or more servers 105 may perform the functionalities as part of a cloud network or may otherwise communicate with other hardware or software components within one or more cloud computing environments to send, retrieve, or otherwise analyze data or information described herein. For example, in certain aspects of the present techniques, the computing environment 100 may include an on-premises computing environment, a multi-cloud computing environment, a public cloud computing environment, a private cloud computing environment, and/or a hybrid cloud computing environment. For example, an entity (e.g., a business) may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premises cloud (i.e., not physically hosted at a location owned/controlled by the business). Alternatively, or in addition, aspects of the public cloud may be hosted on-premises at a location owned/controlled by an entity. The public cloud may be partitioned using visualization and multi-tenancy techniques and may include one or more infrastructure-as-a-service (IaaS) and/or platform-as-a-service (PaaS) services.

The network 110 may comprise any suitable network or networks, including a local area network (LAN), wide area network (WAN), Internet, or combination thereof. For example, the network 110 may include a wireless cellular service (e.g., 4G, 5G, 6G etc.). Generally, the network 110 enables bidirectional communication between the client device 102 and the servers 105. In one aspect, the network 110 may comprise a cellular base station, such as cell tower(s), communicating to the one or more components of the computing environment 100 via wired/wireless communications based on any one or more of various mobile phone standards, including NMT, GSM, CDMA, UMTS, LTE, 5G, 6G, or the like. Additionally or alternatively, the network 110 may comprise one or more routers, wireless switches, or other such wireless connection points communicating to the components of the computing environment 100 via wireless communications based on any one or more of various wireless standards, including by non-limiting example, IEEE 802.11a/b/g/n/ac/ax/be (WiFi), Bluetooth, and/or the like.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine-readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, MacOS, etc.) capable of facilitating the functionalities, apps, methods, or other software as discussed herein.

The memory 122 may store a plurality of computing modules 130, implemented as respective sets of computer-executable instructions (e.g., one or more source code libraries, trained ML models such as neural networks, convolutional neural networks, etc.) as described herein.

In general, a computer program or computer based product, application, or code (e.g., the model(s), such as ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang. Python, C, C++, C#, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data and be used to train and/or operate one or more ML/AI models, chatbots 150, and/or voice bots.

In one aspect, the computing modules 130 may include an ML module 140. The ML module 140 may include ML training module (MLTM) 142 and/or ML operation module (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms may be directed toward at least one of a plurality of categorizations of ML, such as supervised learning, unsupervised learning, and reinforcement learning. In one aspect, the ML based algorithms may be included as a library or package executed on server(s) 105. For example, libraries may include the TensorFlow based library, the PyTorch library, the HuggingFace library, and/or the scikit-learn Python library.

In one embodiment, the ML module 140 employs supervised learning, which involves identifying patterns in existing data to make predictions about subsequently received data. Specifically, the ML module may be "trained" (e.g., via MLTM 142) using training data, which includes example inputs and associated example outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features.

In another embodiment, the ML module 140 may employ unsupervised learning, which involves finding meaningful relationships in unorganized data. Unlike supervised learning, unsupervised learning does not involve user-initiated training based upon example inputs with associated outputs. Rather, in unsupervised learning, the ML module 140 may organize unlabeled data according to a relationship determined by at least one ML method/algorithm employed by the ML module 140. Unorganized data may include any combination of data inputs and/or ML outputs as described above.

In yet another embodiment, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 144 may comprise a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon when provided with de novo input that the model has not previously been provided, the model may output one or more predictions, classifications, etc., as described herein.

In one aspect, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as computer network 110 and/or the client device 102 (for rendering or visualizing) described herein. In one aspect, servers 105 may include a client-server platform technology such as ASP.NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen. I/O module 146 may facilitate I/O components (e.g., ports, capacitive or resistive touch sensitive input panels, keys, buttons, lights, LEDs), which may be directly accessible via, or attached to, servers 105 or may be indirectly accessible via or attached to the client device 102. According to one aspect, an administrator or operator may access the servers 105 via the client device 102 to review information, make changes, input training data, initiate training via the MLTM 142, and/or perform other functions (e.g., operation of one or more trained models via the MLOM 144).

In one aspect, the computing modules 130 may include one or more NLP modules 148 comprising a set of computer-executable instructions implementing NLP, natural language understanding (NLU) and/or natural language generator (NLG) functionality. The NLP module 148 may be responsible for transforming the user input (e.g., unstructured conversational input such as speech or text) to an interpretable format. The NLP module 148 may include an NLU to understand the intended meaning of utterances and/or prompts, among other things. The NLP module 148 may include an NLG, which may provide text summarization, machine translation, and dialog where structured data may be transformed into natural conversational language (i.e., unstructured) for output to the user.

In one aspect, the computing modules 130 may include one or more chatbots and/or voice bots 150 which may be programmed to simulate human conversation, interact with users, understand their needs, generate content (e.g., a customized presentation), and/or recommend an appropriate line of action with minimal and/or no human intervention, among other things. This may include providing the best response of any query that it receives and/or asking follow-up questions.

In some embodiments, the voice bots or chatbots 150 discussed herein may be configured to utilize AI and/or ML techniques. For instance, the voice bot or chatbot 150 may be a ChatGPT chatbot. The voice bot or chatbot 150 may employ supervised or unsupervised machine learning techniques, which may be followed or used in conjunction with reinforced or reinforcement learning techniques. The voice bot or chatbot 150 may employ the techniques utilized for ChatGPT. The voice bot or chatbot may deliver various types of output for user consumption in certain embodiments, such as verbal or audible output, a dialogue output, text or textual output (such as presented on a computer or mobile device screen or display), visual or graphical output, and/or other types of outputs.

Noted above, in some embodiments, a chatbot 150 or other computing device may be configured to implement ML, such that the server 105 "learns" to analyze, organize, and/or process data without being explicitly programmed. In one exemplary embodiment, the ML module 140 may be configured to implement the ML.

For example, in one aspect, the server 105 may initiate a chatbot session over the network 110 with a user via a client device 102, e.g., to provide help to the user of the client device 120. The chatbot 150 may receive utterances and/or prompts from the user, i.e., the input from the user from which the chatbot 150 needs to derive intents from. The utterances and/or prompts may be processed using NLP module 148 and/or ML module 140 via one or more ML models to recognize what the user says, understand the meaning, determine the appropriate action, and/or respond with language (e.g., via text, audio, video, multimedia, etc.) the user can understand.

In one aspect, the server 105 may host and/or provide an application (e.g., a mobile application), and/or a website configured to provide the application, to receive objective, financial goal, and/or investment strategy data from a user via client device 120. In one aspect, the server 105 may store code in memory 122, which when executed by CPU 120, may provide the website and/or application. In some embodiments, the objective, financial goal, and/or investment strategy data may indicate a repository, file location, and/or other data store at which the objective, financial goal, and/or investment strategy data may be maintained. In some embodiments, the server 105 may store the objective, financial goal, and/or investment strategy data in the database 126. The data stored in the database 126 may be cleaned, labeled, vectorized, weighted and/or otherwise processed, especially processing suitable for data used in any aspect of ML.

In a further aspect, when the server 105 receives objective, financial goal, and/or investment strategy data and/or generates personalized instructions and/or investment instructions, the data and/or instructions may be stored in the database 126. In one aspect, the server 105 may use the stored data to generate, train and/or retrain one or more ML models and/or chatbots 150, and/or for any other suitable purpose.

In operation, ML model training module 142 may access database 126 or any other data source for training data suitable to generate one or more ML models to generate the personalized instructions and/or investment instructions, e.g., ML module 140. The training data may be sample data with assigned relevant and comprehensive labels (classes or tags) used to fit the parameters (weights) of an ML model with the goal of training it by example. In one aspect, training data may include documents describing nutritional information, exercise information, prior weight loss results, financial information, prior financial results, insurance claim information, and/or prior insurance claim transactions and results. In another aspect, training data may include data about prior financial transactions, historical market performance, and/or publicly traded companies' financial performance. In one aspect, once an appropriate ML model is trained and validated to provide accurate predictions and/or responses, e.g., ML module 140, the trained model and/or chatbot 150 may be loaded into MLOM 144 at runtime, may process the user inputs and/or utterances, and may generate as an output conversational dialog and/or a customized presentation.

In one aspect, the chatbot 150 (e.g., an AI chatbot) may include one or more ML models trained to generate one or more types of content for a customized communication, such as text component, audio component, images/video, slides, virtual reality, augmented reality, mixed reality component, multimedia, blockchain and/or metaverse content, as well as any other suitable content.

While various embodiments, examples, and/or aspects disclosed herein may include training and generating one or more ML models and/or chatbot 150 for the server 105 to load at runtime, it is also contemplated that one or more appropriately trained ML models and/or chatbot 150 may already exist (e.g., in database 126) such that the server 105 may load an existing trained ML model and/or chatbot 150 at runtime. It is further contemplated that the server 105 may retrain, update and/or otherwise alter an existing ML model and/or Chatbot 150 before loading the model at runtime.

Although the computing environment 100 is shown to include one client device 102, one server 105, and one network 110, it should be understood that different numbers of client devices 102, networks 110, and/or servers 105 may be utilized. In one example, the computing environment 100 may include a plurality of servers 105 and hundreds or thousands of client devices 102, all of which may be interconnected via the network 110. Furthermore, the database storage or processing performed by the one or more servers 105 may be distributed among a plurality of servers 105 in an arrangement known as "cloud computing." This configuration may provide various advantages, such as enabling near real-time uploads and downloads of information as well as periodic uploads and downloads of information.

The computing environment 100 may include additional, fewer, and/or alternate components, and may be configured to perform additional, fewer, or alternate actions, including components/actions described herein. Although the computing environment 100 is shown in FIG. 1 as including one instance of various components such as client device 102, server 105, and network 110, etc., various aspects include the computing environment 100 implementing any suitable number of any of the components shown in FIG. 1 and/or omitting any suitable ones of the components shown in FIG. 1. For instance, information described as being stored at server database 126 may be stored at memory 122, and thus database 126 may be omitted. Moreover, various aspects include the computing environment 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 105 and client device 102 may be connected via a direct communication link (not shown in FIG. 1) instead of, or in addition to, via network 130.

Exemplary Training of the ML Chatbot Model

An enterprise may be able to use programmable chatbots, such chatbot 150 (e.g., ChatGPT), to provide personalized instructions and/or investment instructions. In one aspect, the chatbot may be capable of receiving requests for personalized assistance with an objective. In another aspect, the chatbot may be capable of receiving an investment strategy and a prompt for investment instructions.

The ML chatbot may include and/or derive functionality from a Large Language Model (LLM). The ML chatbot may be trained on a server, such as server 105, using large training datasets of text which may provide sophisticated capability for natural-language tasks, such as answering questions and/or holding conversations. The ML chatbot may include a general-purpose pretrained LLM which, when provided with a starting set of words (prompt) as an input, may attempt to provide an output (response) of the most likely set of words that follow from the input. In one aspect, the prompt may be provided to, and/or the response received from, the ML chatbot and/or any other ML model, via a user interface of the server. This may include a user interface device operably connected to the server via an I/O module, such as the I/O module 146. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user utterances and/or prompts, which may require the ML chatbot to keep track of an entire conversation history as well as the current state of the conversation. The ML chatbot may rely on various techniques to engage in conversations with users, which may include the use of short-term and long-term memory. Short-term memory may temporarily store information (e.g., in the memory 122 of the server 105) that may be required for immediate use and may keep track of the current state of the conversation and/or to understand the user's latest input in order to generate an appropriate response. Long-term memory may include persistent storage of information (e.g., on database 126 of the server 105) which may be accessed over an extended period of time. The ML chatbot may use the long-term memory to store information about the user (e.g., preferences, chat history, etc.) which may improve an overall user experience by enabling the ML chatbot to personalize and/or provide more informed responses.

The system and methods to generate and/or train an ML chatbot model (e.g., via the ML module 140 of the server 105) which may be used by an ML chatbot, may consist of three steps: (1) a Supervised Fine-Tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT (Supervised Fine-Tuning) ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data may be collected on the current ML chatbot model, which may be used to optimize/update the reward model and/or further optimize/update the policy.

Supervised Fine-Tuning (SFT) ML Model

Figure 2:
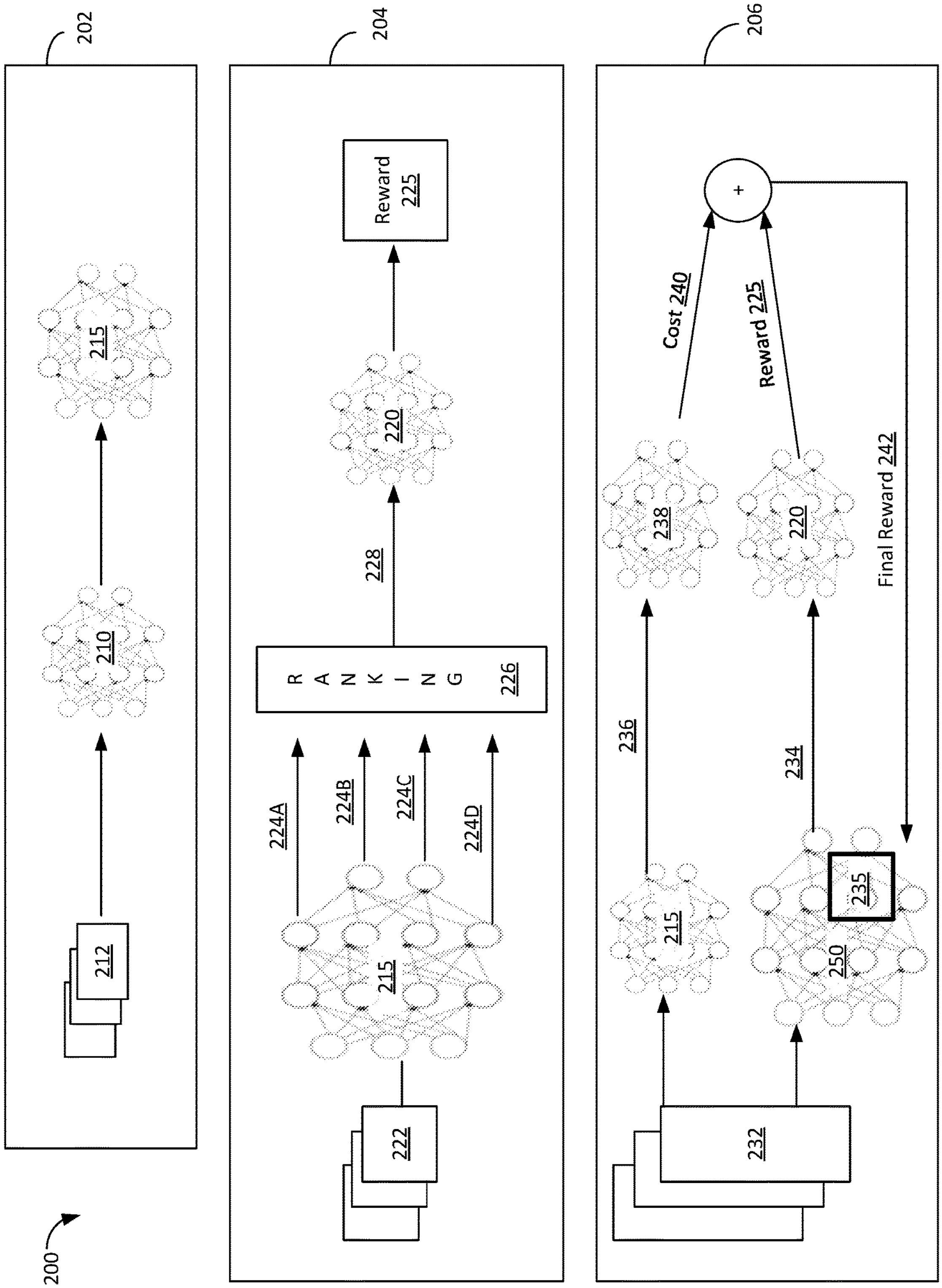
FIG. 2 depicts a combined block and logic diagram for exemplary training of an ML chatbot.

FIG. 2 depicts a combined block and logic diagram 200 for exemplary training of an ML chatbot model, in which the techniques described herein may be implemented, according to some embodiments. Some of the blocks in FIG. 2 may represent hardware and/or software components, other blocks may represent data structures or memory storing these data structures, registers, or state variables (e.g., 212), and other blocks may represent output data (e.g., 225). Input and/or output signals may be represented by arrows labeled with corresponding signal names and/or other identifiers. The methods and systems may include one or more servers 202, 204, 206, such as the server 105 of FIG. 1.

In one aspect, the server 202 may fine-tune a pretrained language model 210. The pretrained language model 210 may be obtained by the server 202 and be stored in a memory, such as the server memory 122 and/or the database 126. The pretrained language model 210 may be loaded into an ML training module, such as MLTM 142, by the server 202 for retraining/fine-tuning. A supervised training dataset 212 may be used to fine-tune the pretrained language model 210 wherein each data input prompt to the pretrained language model 210 may have a known output response for the training the pretrained language model 210. The supervised training dataset 212 may be stored in a memory of the server 202, e.g., the memory 122 and/or the database 126. In one aspect, the data labelers may create the supervised training dataset 212 prompts and appropriate responses. The pretrained language model 210 may be fine-tuned using the supervised training dataset 212, resulting in the SFT ML model 215 which may provide appropriate responses to user prompts once trained. The trained SFT ML model 215 may be stored in a memory of the server 202, e.g., memory 122 and/or database 126.

In one aspect, the supervised training dataset 212 may include prompts and responses which may be relevant to personalized planning and/or automated investing. For example, user prompts may include requests for personalized assistance with an objective and/or investment instructions. Appropriate responses from the trained SFT ML model 215 may include output of personalized instructions for performing the objective and/or investment instructions, among other things.

Training the Reward Model

In one aspect, training the ML chatbot model 250 may include the server 204 training a reward model 220 to provide as an output a scaler value/reward 225. The reward model 220 may be required to leverage Reinforcement Learning with Human Feedback (RLHF) in which a model (e.g., ML chatbot model 250) learns to produce outputs which maximize its reward 225, and in doing so may provide responses which may be better aligned to user prompts.

Training the reward model 220 may include the server 204 providing a single prompt 222 to the SFT ML model 215 as an input. The input prompt 222 may be provided via an input device (e.g., a keyboard) via the I/O module of the server, such as I/O module 146. The prompt 222 may be previously unknown to the SFT ML model 215, e.g., the labelers may generate new prompt data, the prompt 222 may include testing data stored on database 126, and/or any other suitable prompt data. The SFT ML model 215 may generate multiple, different output responses 224A, 224B, 224C, 224D to the single prompt 222. The server 204 may output the responses 224A, 224B, 224C, 224D via an I/O module (e.g., I/O module 146) to a user interface device, such as a display (e.g., as text responses), a speaker (e.g., as audio/voice responses), and/or any other suitable manner of output of the responses 224A, 224B, 224C, 224D for review by the data labelers.

The data labelers may provide feedback via the server 204 on the responses 224A, 224B, 224C, 224D when ranking 226 them from best to worst based upon the prompt-response pairs. The data labelers may rank 226 the responses 224A, 224B, 224C, 224D by labeling the associated data. The ranked prompt-response pairs 228 may be used to train the reward model 220. In one aspect, the server 204 may load the reward model 220 via the ML module (e.g., the ML module 140) and train the reward model 220 using the ranked response pairs 228 the input. The reward model 220 may provide as the output the scalar reward 225.

In one aspect, the scalar reward 225 may include a value numerically representing a human preference for the best and/or most expected response to a prompt, i.e., a higher scaler reward value may indicate the user may be more likely to prefer that response, and a lower scalar reward may indicate that the user may be less likely to prefer that response. For example, inputting the "winning" prompt-response (i.e., input-output) pair data to the reward model 220 may generate a winning reward. Inputting a "losing" prompt-response pair data to the same reward model 220 may generate a losing reward. The reward model 220 and/or scalar reward 236 may be updated based upon labelers ranking 226 additional prompt-response pairs generated in response to additional prompts 222.

In one example, a data labeler may provide to the SFT ML model 215 as an input prompt 222, "Describe the sky." The input may be provided by the labeler via the client device 102 over network 110 to the server 204 running a chatbot application utilizing the SFT ML model 215. The SFT ML model 215 may provide as output responses to the labeler via the client device 102: (i) "the sky is above" 224A; (ii) "the sky includes the atmosphere and may be considered a place between the ground and outer space" 224B; and (iii) "the sky is heavenly" 224C. The data labeler may rank 226, via labeling the prompt-response pairs, prompt-response pair 222/224B as the most preferred answer; prompt-response pair 222/224A as a less preferred answer; and prompt-response 222/224C as the least preferred answer. The labeler may rank 226 the prompt-response pair data in any suitable manner. The ranked prompt-response pairs 228 may be provided to the reward model 220 to generate the scalar reward 225.

While the reward model 220 may provide the scalar reward 225 as an output, the reward model 220 may not generate the response (e.g., text). Rather, the scalar reward 225 may be used by a version of the SFT ML model 215 to generate more accurate responses to prompts, i.e., the SFT model 215 may generate the response such as text to the prompt, and the reward model 220 may receive the response to generate a scalar reward 225 of how well humans perceive it. Reinforcement learning may optimize the SFT model 215 with respect to the reward model 220 which may realize the configured ML chatbot model 250.

Reinforcement Learning with Human Feedback to Train the ML Chatbot Model

In one aspect, the server 206 may train the ML chatbot model 250 (e.g., via the ML module 140) to generate a response 234 to a random, new and/or previously unknown user prompt 232. To generate the response 234, the ML chatbot model 250 may use a policy 235 (e.g., algorithm) which it learns during training of the reward model 220, and in doing so may transition and/or evolve from the SFT model 215 to the ML chatbot model 250. The policy 235 may represent a strategy that the ML chatbot model 250 may learn to maximize its reward 225. As discussed herein, based upon prompt-response pairs, a human labeler may continuously provide feedback to assist in determining how well the ML chatbot's 250 responses match expected responses to determine rewards 225. The rewards 225 may feed back into the ML chatbot model 250 to evolve the policy 235. Thus, the policy 235 may adjust the parameters of the ML chatbot model 250 based upon the rewards 225 it receives for generating preferred responses. The policy 235 may update as the ML chatbot model 250 provides responses 234 to additional prompts 232.

In one aspect, the response 234 of the ML chatbot model 250 using the policy 235 based upon the reward 225 may be compared using a cost function 238 to the SFT ML model 215 (which may not use a policy) response 236 of the same prompt 232. The server 206 may compute a cost 240 based upon the cost function 238 of the responses 234, 236. The cost 240 may reduce the distance between the responses 234, 236, i.e., a statistical distance measuring how one probability distribution is different from a second, in one aspect the response 234 of the ML chatbot model 250 versus the response 236 of the SFT model 215. Using the cost 240 to reduce the distance between the responses 234, 236 may avoid the server (e.g., server 206) over-optimizing the reward model 220 and deviating too drastically from the human-intended/preferred response. Without the cost 240, the ML chatbot model 250 optimizations may result in generating responses 234 which may be unreasonable but may still result in the reward model 220 outputting a high reward 225.

In one aspect, the responses 234 of the ML chatbot model 250 using the current policy 235 may be passed by the server 206 to the rewards model 220, which may return the scalar reward 225. The ML chatbot model 250 response 234 may be compared via cost function 238 to the SFT ML model 215 response 236 by the server 206 to compute the cost 240. The server 206 may generate a final reward 242 which may include the scalar reward 225 offset and/or restricted by the cost 240. The final reward 242 may be provided by the server 206 to the ML chatbot model 250 and may update the policy 235, which in turn may improve the functionality of the ML chatbot model 250.

To optimize the ML chatbot 250 over time, RLHF (via the human labeler feedback) may continue ranking 226 responses of the ML chatbot model 250 versus outputs of earlier/other versions of the SFT ML model 215, i.e., providing positive or negative rewards or adjustment 225. The RLHF may allow the servers (e.g., servers 204, 206) to continue iteratively updating the reward model 220 and/or the policy 235. As a result, the ML chatbot model 250 may be retrained and/or fine-tuned based upon the human feedback via the RLHF process, and throughout continuing conversations may become increasingly efficient.

Although multiple servers 202, 204, 206 may be depicted in the exemplary block and logic diagram 200, each providing one of the three steps of the overall ML chatbot model 250 training, fewer and/or additional servers may be utilized and/or may provide the one or more steps of the ML chatbot model 250 training. In one aspect, one server may provide the entire ML chatbot model 250 training.

Exemplary ML Model for Personal Task Generator to Complete Objectives

In one embodiment, generating personalized instructions for completing an objective may use ML.

Figure 3A:
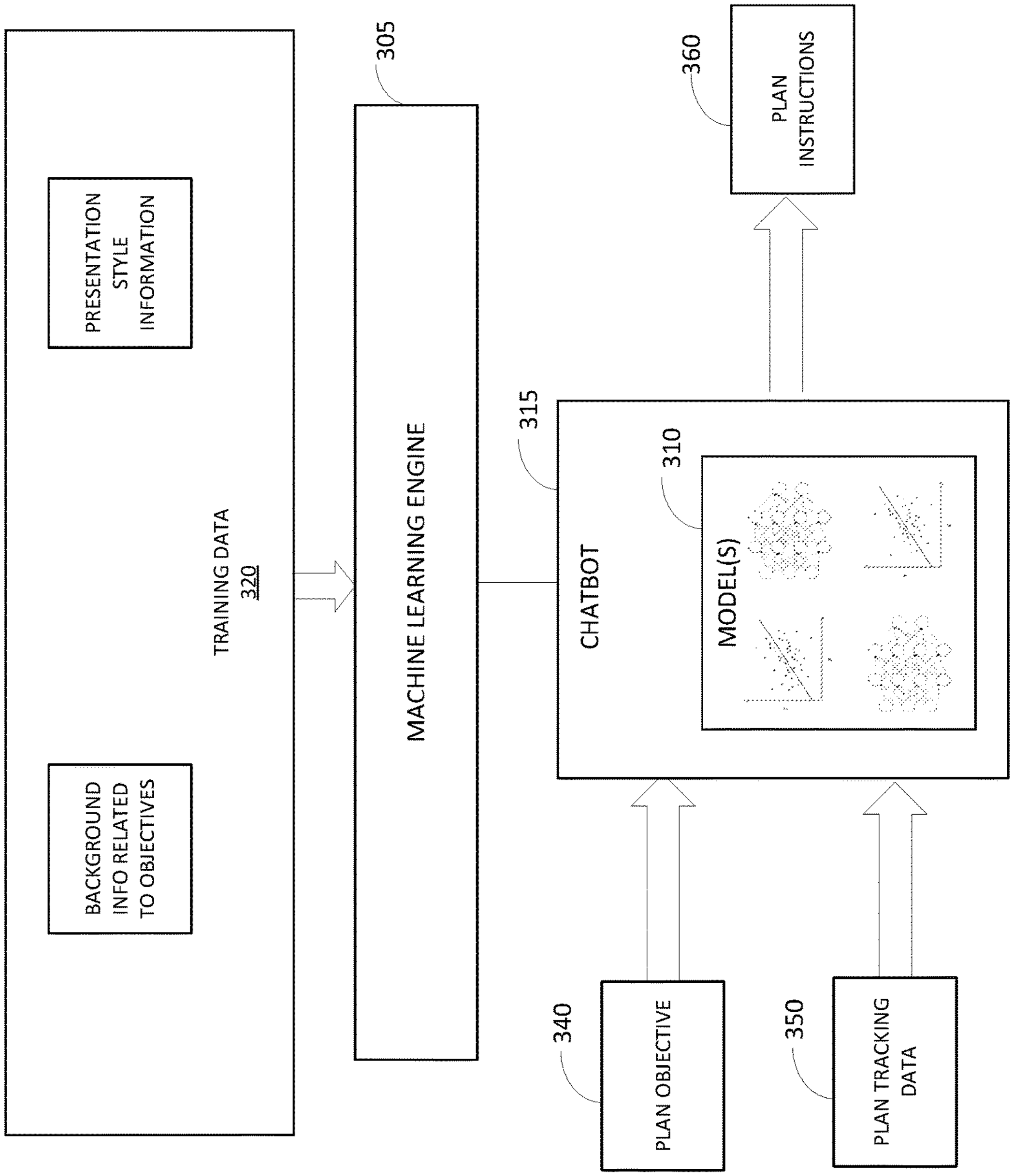
FIG. 3A depicts a combined block and logic diagram of an exemplary server generating personalized planning instructions using generative AI/ML.

FIG. 3A schematically illustrates how an ML model may generate personalized instructions for completing an objective. Some of the blocks in FIG. 3A represent hardware and/or software components (e.g., block 305), other blocks represent data structures or memory storing these data structures, registers, or state variables (e.g., blocks 320), and other blocks represent output data (e.g., block 350). Input and output signals are represented by arrows.

An ML engine 305 may include one or more hardware and/or software components, such as the MLTM 142 and/or the MLOM 144, to obtain, create, (re)train, operate and/or save one or more ML models 310. To generate an ML model 310, the ML engine 305 may use training data 320.

As described herein, the server such as server 105 may obtain and/or have available various types of training data 320 (e.g., stored on database 126 of server 105). In an aspect, the training data 320 may labeled to aid in training, retraining and/or fine-tuning the ML model 310. The training data 320 may include background information relevant to one or more objectives. The training data 320 may include nutritional information, exercise information, prior weight loss results, financial information, prior financial results, insurance claim information, and/or prior insurance claim transactions and results. The training data 320 may be in a structured or unstructured format. For example, the nutritional information may comprise nutritional data about different foods, descriptions of diet plans, etc. Exercise information may comprise fitness routines, calories burned per unit of time for the routines, etc. Prior weight loss results may include data compiled from users regarding their age, sex, body mass index, dietary intake, exercise routines, and/or weight loss results. Financial information may comprise investment strategies, savings strategies, etc. Prior financial results may include data compiled from users regarding their income, expenses, assets, debts, and/or financial transactions. Insurance claim information may comprise sample insurance policies, claim forms, etc. Prior insurance claim transactions and results may include data compiled from users regarding their insurance coverages, loss documentation, communications with their insurance provider, and/or claim payments. New training data 320 may be used to retrain or update the ML model 310.

While the example training data includes indications of various types of training data 320, this is merely an example for ease of illustration only. The training data 320 may include any suitable data that may indicate associations between objectives and instructions to accomplish the objectives. The ML model 310 trained on such training data 320 will have an improved capability to generate the plan instructions 360 when compared to a conventional ML chatbot.

In an aspect, the server may continuously update the training data 320, e.g., based upon obtaining data sources related to the background information, feedback or data collected from prior plan instructions, or any other training data. Subsequently, the ML model 310 may be retrained/fine-tuned based upon the updated training data 320. Accordingly, the generation of personalized instructions may improve over time.

In an aspect, the ML engine 305 may process and/or analyze the training data 320 (e.g., via MLTM 142) to train the ML model 310 to generate the plan instructions 360. The ML model 310 may be trained to generate the plan instructions 360 via a large language model, neural network, deep learning model, Transformer-based model, generative pre-trained transformer (GPT), generative adversarial network (GAN), regression model, k-nearest neighbor algorithm, support vector regression algorithm, and/or random forest algorithm, although any type of applicable ML model/algorithm may be used, including training using one or more of supervised learning, unsupervised learning, semi-supervised learning, and/or reinforcement learning.

Once trained, the ML model 310 may perform operations on one or more data inputs to produce a desired data output. In one aspect, the ML model 310 may be loaded at runtime (e.g., by the MLOM 144) from a database (e.g., the database 126 of the server 105) to process plan objective 340 and/or plan tracking data 350 data inputs. The server, such as server 105, may obtain the plan objective 340 and/or the plan tracking data 350 and use it as inputs to generate the plan instructions 360. In one aspect, the server may obtain the plan objective 340 and/or the plan tracking data 350 via the client device 102 via a website, the chatbot 150, or any other suitable user device. In one aspect, the chatbot 150 may generate follow up questions in response to the plan objective 340 in order to gather additional information necessary for generating the plan instructions 360. In one aspect, the server may obtain the plan information 350 from a data store, e.g., database 126 plan tracking data 350.

In one aspect, the plan objective 340 and/or the plan tracking data 350 may comprise unstructured text. For example, the plan objective 340 may comprise freeform text typed by the user and/or verbal statements spoken by the user. In another aspect, the plan objective 340 and/or the plan tracking data 350 may comprise structured data. For example, the plan objective 340 may comprise responses to questions (e.g., target date, target weight, etc.) presented in a mobile application and/or website. The plan tracking data 350 may comprise standardized data fields (e.g., current weight, etc.). The plan tracking data 350 may be obtained through user input or automatically collected from the client device 102.

In one aspect, the plan objective 340 may include a target completion deadline. The plan instructions 360 may include target dates for completing one or more discrete steps.

Once the plan instructions 360 are generated by ML 310, they may be provided to the client device 102 or to another user device. For example, the server 105 may provide the plan instructions 360 via a mobile app to mobile device, in an email, a website, via a chatbot (such as the chatbot 315), and/or in any other suitable manner.

Generative AI/ML may enable a computer, such as the server 105, to use existing data (e.g., as an input and/or training data) such as text, audio, video, images, and/or code, among other things, to generate new content, such as personalized instructions customized for a user, via one or more models. Generative ML may include unsupervised and semi-supervised ML algorithms, which may automatically discover and learn patterns in input data. Once trained, e.g., via MLTM 142, a generative ML model may generate content as an output which plausibly may have been drawn from the original input dataset and may include the content in the customized presentation. In one aspect, an ML chatbot such as chatbot 150 may include one or more generative AI/ML models.

Some types of generative AI/ML may include generative adversarial networks (GANs) and/or transformer-based models. In one aspect, the GAN may generate images, visual and/or multimedia content from image and/or text input data. The GAN may include a generative model (generator) and discriminative model (discriminator). The generative model may produce an image which may be evaluated by the discriminative model and use the evaluation to improve operation of the generative model. The transformer-based model may include a generative pre-trained language model, such as the pre-trained language model used in training ML chatbot model 250 described herein. Other types of generative AI/ML may use the GAN, the transformer model, and/or other types of models and/or algorithms to generate: (i) realistic images from sketches, which may include the sketch and object category as input to output a synthesized image; (ii) images from text, which may produce images (realistic, paintings, etc.) from textual description inputs; (iii) speech from text, which may use character or phoneme input sequences to produce speech/audio outputs; (iv) audio, which may convert audio signals to two-dimensional representations (spectrograms) which may be processed using algorithms to produced audio; and/or (v) video, which may generate and convert video (i.e., a series of images) using image processing techniques and may include predicting what the next frame in the sequence of frames/video may look like and generating the predicted frame. With the appropriate algorithms and/or training, generative AI/ML may produce various types of multimedia output and/or content which may be incorporated into a customized presentation, e.g., via an AI and/or ML chatbot (or voice bot).

In one aspect, an organization may use the AI and/or ML chatbot, such as the trained chatbot 150, to generate one or more customized components of the customized presentation to walk a user through the generated personalized instructions. The trained ML chatbot may generate output such as images, video, slides (e.g., a PowerPoint slide), virtual reality, augmented reality, mixed reality, multimedia, blockchain entries, metaverse content, or any other suitable components which may be used in the customized presentation.

Once trained, the ML chatbot which may include on one more generative AI/ML models such as those described may be able to generate the customized presentation based upon one or more prompts, such as an identification of a user and a prompt for personalized assistance with an objective. In response, the ML chatbot may generate audio/voice/speech, text, slides, and/or other suitable content which may be included in the customized presentation.

In one aspect, the chatbot 315 may use, access, be operably connected to and/or otherwise include one or more ML models 310 to generate a customized presentation of the plan instructions 360. The chatbot 315 may generate the customized presentation in response to receiving the plan objective 340 and the plan tracking data 350 as the input.

In one aspect, the training data 320 may include presentation style information such as images, text, phonemes, audio, or other types of data which may be used as inputs as discussed herein for training one or more AI/ML models to generate different types of presentation components. The training data 320 may include style information related to a particular style (e.g., fonts, logos, emblems, colors, etc.) an organization would like the customized presentation components to emulate. The training data 320 may include user profile information which may affect customizing the presentation for a particular user or organization, e.g., the sophistication level of a particular user. The training data 320 may include background information relevant to an objective that may be relevant to include in the customized presentation for a similar type of objective. While the example training data 320 includes indications of various types of data, this is merely an example for ease of illustration only. The training data 320 may include any data relevant to generating the customized presentation of the plan instructions 360.

At runtime to create the customized presentation, the ML module 305 may load one or more ML models 310 and/or chatbots 315 in a memory. The server 105 may obtain the plan objective 340 and/or the plan tracking data 350, e.g., as input from user device 102, as well as any other suitable manner of obtaining plan objective 340 and/or the plan tracking data 350. In one aspect, the user for whom the identified plan instructions 360 is being generated provides the plan objective 340 and/or the plan tracking data 350 via the chatbot 315, e.g., using a web interface. In another embodiment, the user uploads one or more files containing the plan tracking data 350. The plan objective 340 and/or the plan tracking data 350 may be provided as an input to the one or more ML models 310 and/or chatbots 315. The one or more chatbots 315 and/or ML models 310 may employ one or more AI/ML models (e.g., SFT ML model, GAN, pre-trained language models, etc.) and/or algorithms (e.g., supervised learning, unsupervised learning, semi-supervised learning, and/or reinforcement learning) discussed herein to generate the customized presentation of the plan instructions 360. For example, a user may provide plan objective 340 and/or the plan tracking data 350 and request assistance with accomplishing the plan objective. One or more ML models 310 and/or chatbots 315 may generate the customized plan instructions 360 to use style information such as colors, fonts and/or logos associated with a user and/or an organization, among other things.

An organization may update and save in a memory, such as memory 122 and/or database 126 of server 105, training data 320. ML model 305 may use the updated training data 320 to retrain and/or fine tune the ML model 310 and/or chatbot 315. For example, the organization may create updated organization style information which may affect the look of newly generated customized plan instructions 360. Subsequently, one or more ML models 310 may be retrained (e.g., via MLTM 142) based upon updated training data 320.

Figure 3B:
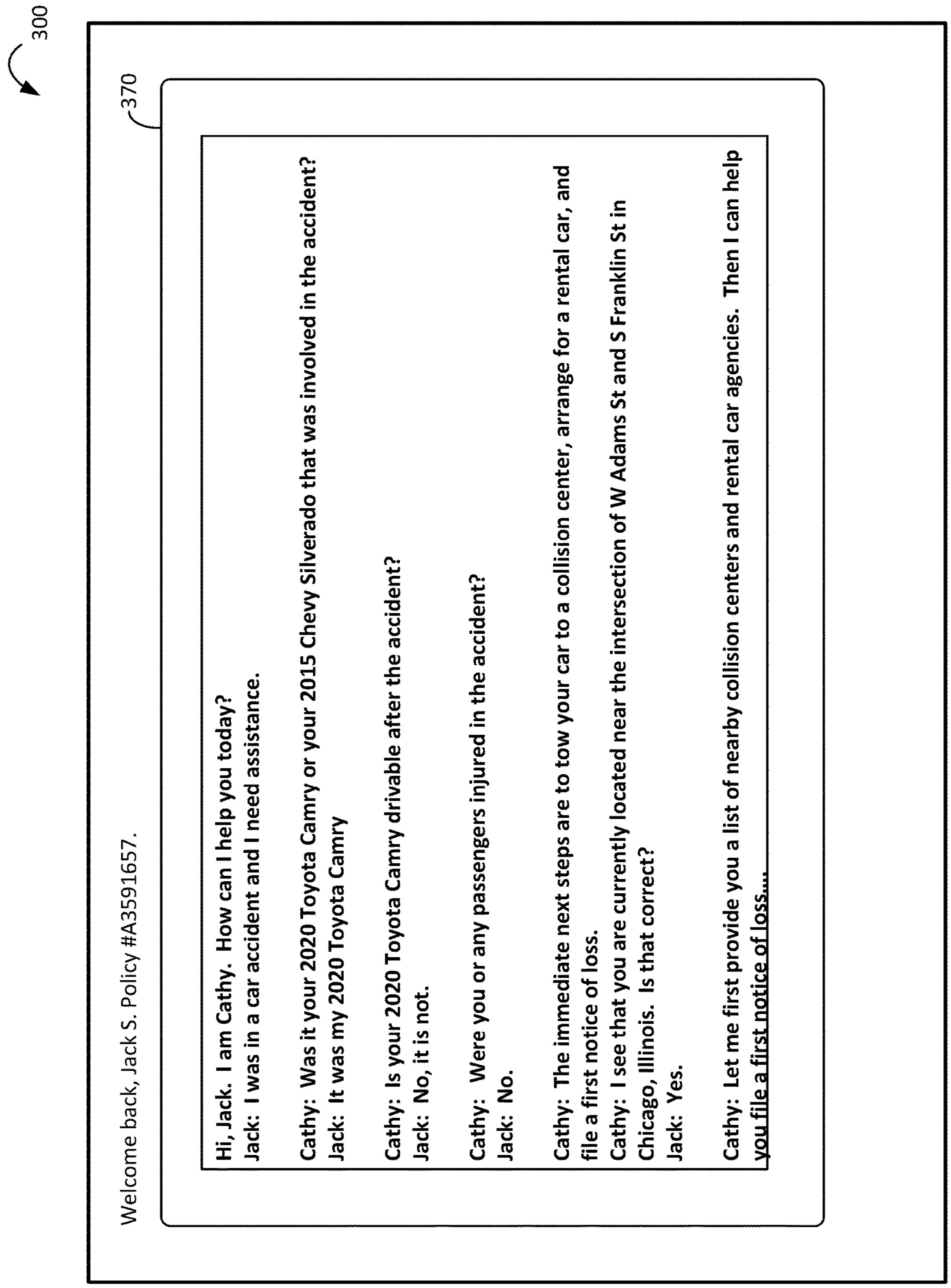
FIG. 3B depicts an exemplary enterprise mobile application employing an ML chatbot to receive an insurance claim objective from a policyholder and provide personalized insurance claim instructions.

Exemplary Application for Receiving the Insurance Claim Objective from a Policyholder FIG. 3B depicts an exemplary display 300 of an enterprise mobile application (app) employing an ML chatbot, such as a ML chatbot described with respect to FIGS. 1 and 2, to receive a plan objective to obtain plan instructions. In the illustrated example, the plan objective is an insurance claim objective, and the plan instructions are insurance claim filing instructions. The app may be run on a user device 102 communicating with a server 105 via a network 110.

Upon experiencing a loss, a policyholder may wish to receive insurance claim filing instructions from their insurance carrier. In one aspect, the insurance carrier may provide a mobile app which a policyholder may use to plan claim objectives and receive plan instructions via their user device 102. In the example of FIG. 3B, a policyholder Jack may use his smartphone app to receive insurance claim filing instructions due to a vehicle accident.

The policyholder may sign into the application via the user device 102 (e.g., a smartphone, tablet, laptop) using their user credentials, such as a username and password. The user credentials may be transmitted by the user device 102 via a network 110 to the insurance carrier's server 105. The server 105 may verify the policyholder's user credentials, e.g., via profile data saved on a database 126. Upon verification of the credentials by the server 105, the app may provide to the user one or more business functions associated with the enterprise, which may include assistance with claim instructions.

The server 105 may initiate a chat session 370 within the app. The chat session 370 may include one or more of (i) audio (e.g., a telephone call), (ii) text messages (e.g., short messaging/SMS, multimedia messaging/MMS, iPhone iMessages, etc.), (iii) instant messages (e.g., real-time messaging such as a chat window), (iv) video such as video conferencing, (v) communication using virtual reality, (vi) communication using augmented reality, (vii) blockchain entries, (vii) communication in the metaverse, and/or any other suitable form of communication. The chat session 370 the server 105 initiates may include instant messaging and/or an interactive voice session, in which Jack may speak his natural language responses into the smartphone.

The policyholder may provide a brief description of the insurance claim objective via the mobile app. The mobile app may request the policyholder provide information associated the claim, which may indicate what other information may be relevant and/or necessary to obtain to provide claim filing instructions. The claim information may include one or more of: (i) a type of insurance claim (e.g., vehicle, property, personal injury, etc.), and/or (ii) user profile information (e.g., policyholder and/or claimant name, policy information, etc.), as well as any other suitable information. At least some of the claim information may be available to the insurance carrier, e.g., based upon the user profile associated with the policyholder identified upon logging into the app. In one aspect, based upon Jack's user profile, the server 105 may obtain Jack's policyholder data such as name, address, date of birth, insurance policy/policies information (e.g., types of policies, account numbers, coverage information, items covered, etc.), as well as other suitable information. In another aspect, based on location information provided by user device 102, the server 105 may obtain Jack's current location. The server 105 may request the claim information from the policyholder via the app via one or more of text (e.g., messaging, chat), voice (e.g., telephone call), videoconference, and/or any other suitable manner.

The server 105 may generate one or more requests for claim information via a chatbot 150. In one aspect, the chatbot 150 may be an ML chatbot, although the chatbot 150 may be an AI chatbot, a voice bot and/or any other suitable chatbot/voice bot as described herein. The server 105 may select an appropriate chatbot 150 based upon the method of communication with the policyholder, one or more pieces of information the policyholder provides to the server 105, and/or other aspects of the insurance claim objective. In one example, the server 105 may train (e.g., via ML module 140 and/or MLTM 142) and select one or more chatbots 150 to receive the insurance claim objective from the policyholder based upon the type of loss/insurance claim. The chatbot 150 may operate in a conversational manner and obtain the insurance claim objective and initial information from the policyholder without any human intervention on the part of the enterprise.

Through the one or more requests, the chatbot 150 may receive additional claim information from the policyholder which may be pertinent to generating insurance claim filing instructions and may include, but is not limited to, property effected by the loss, location of the loss, date and time of the loss, description of the loss and/or events surrounding the loss, as well as any other suitable information.

In the example according to FIG. 3B, after Jack launches the app and begins the chat session 370, the server 105 may initiate an ML chatbot Cathy. The ML chatbot Cathy may be a trained ML model stored on database 126 which the server 105 may load into MLOM 144 during the chat session 370. Once initiated, ML chatbot Cathy may request the claim objective and claim information from Jack in conversational nature via the app. ML chatbot Cathy may request claim information regarding which of Jack's vehicles was involved in the accident, when and where Jack's vehicle accident occurred, whether Jack's vehicle is drivable, whether there were any injuries, etc. The content of ML chatbot Cathy's requests may be provided as text via the chat session 370 chat window. In one aspect, the ML chatbot Cathy may also provide audio which may sound like a human speaking the requests. Generating the audio may include NLG of NLP module 148 to convert structured responses via ML chatbot Cathy into natural conversational language.

In one aspect, ML model 310 may generate insurance claim filing instructions, such as seeking medical assistance for any injuries, requesting a tow truck, contacting a collision center, submitting a first notice of loss with the insurance provider, etc., which may be communicated to Jack by ML chatbot Cathy. ML chatbot Cathy may request permission from Jack to track his progress in completing the steps in the generated insurance claim filing instructions. Progress tracking may include prompts and/or reminders via the app to remind Jack of upcoming steps and ask if steps have been completed. The tracked progress may be communicated to Jack via the app. In one aspect, ML model 310 may use the tracked progress to update the insurance claim filing instructions and provide those updated insurance claim filing instructions to Jack via ML chatbot Cathy. In another aspect, ML model 310 may generate an alert and ML chatbot Cathy may send the alert to Jack through the app if a target date for completing the plan objective 340 and/or one or more steps has not or will not be met.

In one aspect, the server 105 may analyze and/or process the claim information received by the chatbot 150 via the app to interpret, understand and/or extract relevant information within one or more responses from the policyholder. In one aspect processing the claim information the chatbot 150 receives may include the NLP module 148 (e.g., the NLU and/or NLG modules), among other things. The chatbot 150 may also generate additional requests based upon the claim information it receives.

In one aspect, Jack may be able to speak his answers to the requests for information into the microphone of his user device 120. ML chatbot Cathy may be trained and configured to interpret Jack's spoken responses. In one example, ML chatbot Cathy may be trained using training data on database 126 which may include male voices describing vehicle accidents. In one example, ML chatbot Cathy may have NLP processing capabilities to interpret Jack's spoken responses during the chat session 370, which may include accessing an NLP module such as NLP module 148.

The chat session 370 may generate various types of information and/or data which may include information provided by the policyholder, such as the claim objective and/or the claim information provided in policyholder responses to the chatbot 150. The chat session information may be stored by the server 105 in memory, such as the memory 122 and/or database 126.

The chat session information may include data generated from an analysis of the initial information responses. In one aspect, the server 105, e.g., via NLP model 148 and/or the chatbot 150, may analyze the claim information for indications of policyholder sentiment, such as the emotion of the policyholder (e.g., upset, stressed, calm, frustrated, impatient, etc.). In one aspect, the session information may indicate whether the policyholder's responses may provide accurate information to fulfill the requests the chatbot 150 generates. Other types of suitable analysis and/or analytics may be obtained from the session information.

In one aspect, types of data the session may generate may include the length of the session, which may indicate how effective the chatbot 150 may be at gathering necessary information from the policyholder (e.g., a short session may not gather enough information; a long session may provide too much and/or inaccurate information). Another type of data the session may generate may include how many requests were generated by the chatbot 150, which may also indicate the quality and/or effectiveness of the session (e.g., too few questions may not gather enough information and too many questions may indicate ineffectiveness of the questions being asked). The number of requests may also indicate when the session warrants termination, for example the chatbot 150 may no longer have any requests to generate which may indicate all information relevant to the claim objective may be gathered. Any suitable analytics and/or data may be generated and or analyzed from the session which may indicate the quality and/or effectiveness of the session and/or chatbot 150.

In one aspect, based upon the analysis of the session information, the ML model 310 may generate insurance claim filing instructions (such as the plan instructions 360). In one aspect, the chatbot 150 may detect the policyholder would prefer customer service from a human, such a customer service representative.

In one aspect, the chatbot 150 may create the summary of the session and provide the summary to an enterprise device, e.g., storing the summary in the database 126, emailing a transcript of the summary, etc. The summary may include the plan objective 340, the requests for claim information, the responses received in light of the requests, policyholder sentiment, policyholder profile information, as well as any other suitable information. In one aspect, the summary information may be used to retrain and/or fine-tune the chatbot 150, e.g., via MLTM 142.

In one aspect, the chatbot 150 may determine a confidence level at one or more instances during the session. The confidence level and/or score, which may be a number between 0 and 1, may represent the likelihood that the output of an ML chatbot/model is correct and will satisfy a user's request. As the output of ML models/systems may include one or more predictions, each prediction may have a confidence score wherein the higher the score, the more confident the ML may be that the prediction may satisfy the user's request. In conversational AI/ML which may include a chatbot 150, one or more stages may process the request and/or input of a user. In one aspect, during NLU, the chatbot 150 may predict the user intent (what the user is looking for) from an utterance/prompt (what the user may say or type). In one aspect, during sentiment and/or emotion analysis, the chatbot 150 may predict the sentiment (e.g., positive, negative, or neutral) and/or the emotion of the user based upon the user utterance and/or the prompt (back and forth between the user and the agent) transcript. In one aspect, during NLG, the chatbot 150 may predict what to respond based upon the user utterance/prompt. One or more of these predictions may have an associated confidence score/level.

In one aspect, the server 105 and/or chatbot 150 may determine the confidence level based upon the interactions between the chatbot 150 and the policyholder during the session, e.g., how accurately does it seem the chatbot 150 is able to interpret the policyholder responses, how effective are chatbot 150 requests, and/or other suitable metrics and/or analysis of the session to determine the confidence level of the chatbot 150. In one aspect, the chatbot 150 confidence level may be compared to a threshold confidence level (e.g., which may also be a value between 0 and 1) by the server 105 and/or chatbot 150. If the chatbot 150 confidence level falls below the threshold, one or more actions may be taken by the server 105 and/or chatbot 150, such as ending the session, using a different chatbot 150 to continue the session (e.g., one which may be trained to more effectively assist the policyholder), transferring the session to a customer service representative, and/or any other suitable action as may be described herein.

Figure 3C:
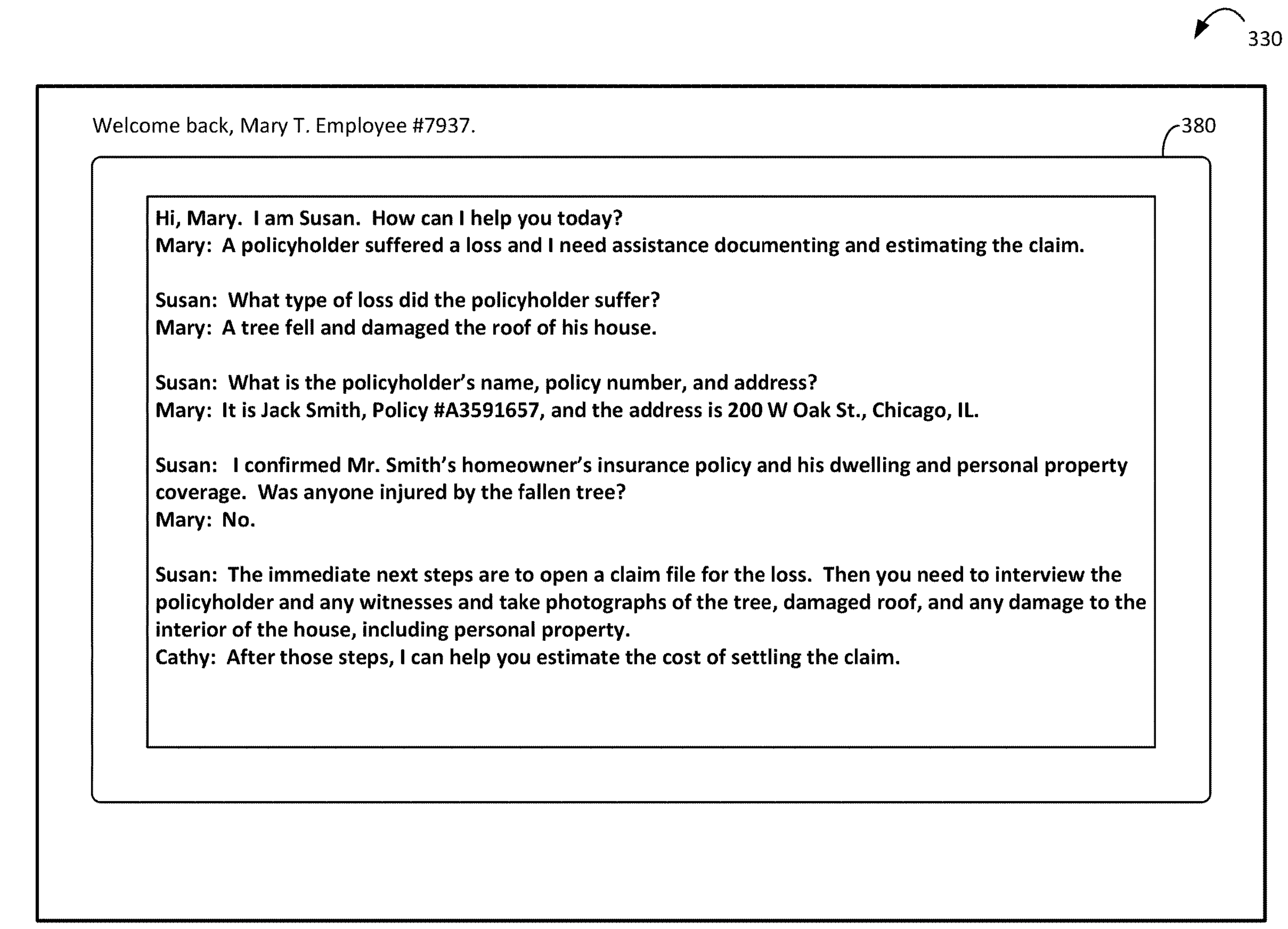
FIG. 3C depicts an exemplary enterprise mobile application employing an ML chatbot to receive an insurance claim objective from a claims adjuster and provide personalized claim investigation and settlement instructions.

Exemplary Application for Receiving the Insurance Claim Objective from a Claims Adjuster FIG. 3C depicts an exemplary display 330 of an enterprise mobile application (app) employing an ML chatbot, such as a ML chatbot described with respect to FIGS. 1 and 2, to receive a plan objective to obtain plan instructions. In the illustrated example, the plan objective is an insurance claim objective, and the plan instructions are claim documentation and settlement instructions. The app may be run on a user device 102 communicating with a server 105 via a network 110.

When investigating a loss, a claims adjuster may wish to receive claim documentation and settlement instructions. In one aspect, the insurance carrier may provide a mobile app which claims adjusters may use to plan claim objectives and receive plan instructions via their user device 102. In the example of FIG. 3C, a claims adjuster Mary may use her smartphone app to receive claim documentation and settlement instructions for damage to a policyholder's house.

The claims adjusters may sign into the application via the user device 102 (e.g., a smartphone, tablet, laptop) using their user credentials, such as a username and password. The user credentials may be transmitted by the user device 102 via a network 110 to the insurance carrier's server 105. The server 105 may verify the claims adjuster's user credentials, e.g., via profile data saved on a database 126. Upon verification of the credentials by the server 105, the app may provide to the claims adjuster one or more business functions associated with the enterprise, which may include assistance with claim documentation and settlement instructions.

The server 105 may initiate a chat session 380 within the app. The chat session 380 may include one or more of (i) audio (e.g., a telephone call), (ii) text messages (e.g., short messaging/SMS, multimedia messaging/MMS, iPhone iMessages, etc.), (iii) instant messages (e.g., real-time messaging such as a chat window), (iv) video such as video conferencing. (v) communication using virtual reality, (vi) communication using augmented reality, (vii) blockchain entries, (vii) communication in the metaverse, and/or any other suitable form of communication. The chat session 380 the server 105 initiates may include instant messaging and/or an interactive voice session, in which Mary may speak her natural language responses into the smartphone.

The claims adjuster may provide a brief description of the insurance claim objective via the mobile app. The mobile app may request the claims adjuster provide information associated the loss, which may indicate what other information may be relevant and/or necessary to obtain to provide claim instructions. The claim information may include one or more of: (i) a type of insurance claim (e.g., vehicle, property, personal injury, etc.), and/or (ii) user profile information (e.g., policyholder and/or claimant name, policy information, etc.), as well as any other suitable information. At least some of the claim information may be available to the insurance carrier, e.g., based upon the policyholder identification submitted via the app. In one aspect, based upon the submitted policyholder identification, the server 105 may obtain policyholder data such as date of birth, insurance policy/policies information (e.g., types of policies, account numbers, coverage information, items covered, etc.), prior claims data, as well as other suitable information. The server 105 may request the claim information from the claims adjuster via the app via one or more of text (e.g., messaging, chat), voice (e.g., telephone call), videoconference, and/or any other suitable manner.

The server 105 may generate one or more requests for claim information via a chatbot 150. In one aspect, the chatbot 150 may be an ML chatbot, although the chatbot 150 may be an AI chatbot, a voice bot and/or any other suitable chatbot/voice bot as described herein. The server 105 may select an appropriate chatbot 150 based upon the method of communication with the claims adjuster, one or more pieces of information the claims adjuster provides to the server 105, and/or other aspects of the insurance claim objective. In one example, the server 105 may train (e.g., via ML module 140 and/or MLTM 142) and select one or more chatbots 150 to receive the insurance claim objective from the claims adjuster based upon the type of loss/insurance claim. The chatbot 150 may operate in a conversational manner and obtain the insurance claim objective and initial information from the claims adjuster without any human intervention on the part of the enterprise.

Through the one or more requests, the chatbot 150 may receive additional claim information from the claims adjuster which may be pertinent to claim documentation and settlement instructions and may include, but is not limited to, property effected by the loss, location of the loss, date and time of the loss, description of the loss and/or events surrounding the loss, as well as any other suitable information.

In the example according to FIG. 3C, after Mary launches the app and begins the chat session 380, the server 105 may initiate an ML chatbot Susan. The ML chatbot Susan may be a trained ML model stored on database 126 which the server 105 may load into MLOM 144 during the chat session 380. Once initiated, ML chatbot Susan may request the claim objective and claim information from Mary in conversational nature via the app. ML chatbot Susan may request claim information regarding policyholder identification, what property of the policyholder was affected by the loss, what type of loss occurred, whether there were any injuries, etc. The content of ML chatbot Susan's requests may be provided as text via the chat session 380 chat window. In one aspect, the ML chatbot Susan may also provide audio which may sound like a human speaking the requests. Generating the audio may include NLG of NLP module 148 to convert structured responses via ML chatbot Susan into natural conversational language.

In one aspect, ML model 310 may generate claim documentation and settlement instructions, such as opening a claim file, interviewing the policyholder and any witnesses, photographing the damage, taking inventory of the damaged property, etc., which may be communicated to Mary by ML chatbot Susan. ML chatbot Susan may request permission from Mary to track her progress in completing the steps in the claim documentation and settlement instructions. Progress tracking may include prompts and/or reminders via the app to remind Mary of upcoming steps and ask if steps have been completed. The tracked progress may be communicated to Mary via the app. In one aspect, ML model 310 may use the tracked progress to update the claim documentation and settlement instructions and provide those updated claim documentation and settlement instructions to Mary via ML chatbot Susan. In another aspect, ML model 310 may generate an alert and ML chatbot Susan may send the alert to Mary through the app if a target date for completing the plan objective 340 and/or one or more steps has not or will not be met.

In one aspect, the server 105 may analyze and/or process the loss information received by the chatbot 150 via the app to interpret, understand and/or extract relevant information within one or more responses from the claims adjuster. In one aspect processing the claim information the chatbot 150 receives may include the NLP module 148 (e.g., the NLU and/or NLG modules), among other things. The chatbot 150 may also generate additional requests based upon the claim information it receives.

In one aspect, Mary may be able to speak her answers to the requests for information into the microphone of her user device 120. ML chatbot Susan may be trained and configured to interpret Mary's spoken responses. In one example, ML chatbot Susan may be trained using training data on database 126 which may include female voices describing damaged houses. In one example, ML chatbot Susan may have NLP processing capabilities to interpret Mary's spoken responses during the chat session 370, which may include accessing an NLP module such as NLP module 148.

The chat session 380 may generate various types of information and/or data which may include information provided by the claims adjuster, such as the claim objective and/or the loss information provided in the claims adjuster's responses to the chatbot 150. The chat session information may be stored by the server 105 in memory, such as the memory 122 and/or database 126.

The chat session information may include data generated from an analysis of the initial information responses. In one aspect, the server 105, e.g., via NLP model 148 and/or the chatbot 150, may analyze the loss information for indications of claims adjuster sentiment, such as the emotion of the claims adjuster (e.g., upset, stressed, calm, frustrated, impatient, etc.). In one aspect, the session information may indicate whether the claims adjuster's responses may provide accurate information to fulfill the requests the chatbot 150 generates. Other types of suitable analysis and/or analytics may be obtained from the session information.

In one aspect, types of data the session may generate may include the length of the session, which may indicate how effective the chatbot 150 may be at gathering necessary information from the claims adjuster (e.g., a short session may not gather enough information; a long session may provide too much and/or inaccurate information). Another type of data the session may generate may include how many requests were generated by the chatbot 150, which may also indicate the quality and/or effectiveness of the session (e.g., too few questions may not gather enough information and too many questions may indicate ineffectiveness of the questions being asked). The number of requests may also indicate when the session warrants termination, for example the chatbot 150 may no longer have any requests to generate which may indicate all information relevant to the claim objective may be gathered. Any suitable analytics and/or data may be generated and or analyzed from the session which may indicate the quality and/or effectiveness of the session and/or chatbot 150.

In one aspect, based upon the analysis of the session information, the ML model 310 may generate claim documentation and settlement instructions (such as the plan instructions 360). In one aspect, the chatbot 150 may detect the claims adjuster would prefer customer service from a human, such a customer service representative.

In one aspect, the chatbot 150 may create the summary of the session and provide the summary to an enterprise device, e.g., storing the summary in the database 126, emailing a transcript of the summary, etc. The summary may include the plan objective 340, the requests for claim information, the responses received in light of the requests, claims adjuster sentiment, claims adjuster profile information, as well as any other suitable information. In one aspect, the summary information may be used to retrain and/or fine-tune the chatbot 150, e.g., via MLTM 142.

Exemplary ML Model for Automated Investment Advising

In one embodiment, an automated investing system may use ML.

Figure 4A:
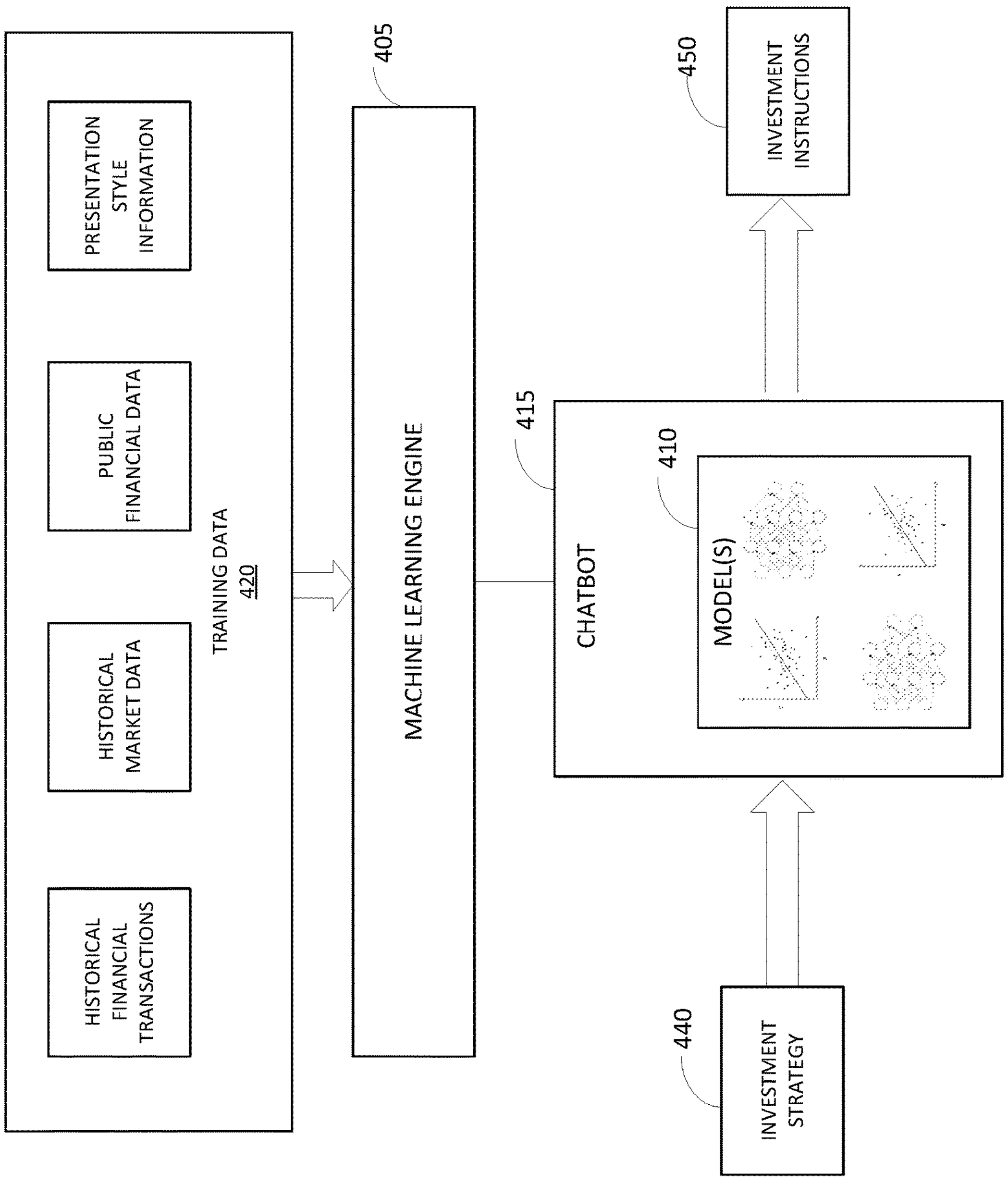
FIG. 4A depicts a combined block and logic diagram of an exemplary server generating investment instructions using generative AI/ML.

FIG. 4A schematically illustrates how an ML model may receive an investment strategy and generate investment instructions. Some of the blocks in FIG. 4A represent hardware and/or software components (e.g., block 405), other blocks represent data structures or memory storing these data structures, registers, or state variables (e.g., blocks 420), and other blocks represent output data (e.g., block 450). Input and output signals are represented by arrows.

An ML engine 405 may include one or more hardware and/or software components, such as the MLTM 142 and/or the MLOM 144, to obtain, create, (re)train, operate and/or save one or more ML models 410. To generate an ML model 410, the ML engine 405 may use training data 420.

As described herein, the server such as server 105 may obtain and/or have available various types of training data 420 (e.g., stored on database 126 of server 105). In an aspect, the training data 420 may labeled to aid in training, retraining and/or fine-tuning the ML model 410. The training data 420 may include background information relevant to investing. The training data 420 may include an investor's prior financial transactions, historical financial transactions according to one or more investing strategies, historical market data, and/or financial data of publicly-traded companies, index funds, mutual funds, or commodities. The training data 420 may be in a structured or unstructured format. New training data 420 may be used to retrain or update the ML model 410.

While the example training data includes indications of various types of training data 420, this is merely an example for ease of illustration only. The training data 420 may include any suitable data that may indicate associations between investment strategies and investment instructions to accomplish the strategies.

In an aspect, the server may continuously update the training data 420, e.g., based upon obtaining additional financial transactions, new market data, public financial data, feedback or data collected from prior investments, or any other training data. Subsequently, the ML model 410 may be retrained/fine-tuned based upon the updated training data 420. Accordingly, the generation of personalized instructions may improve over time.

In an aspect, the ML engine 405 may process and/or analyze the training data 420 (e.g., via MLTM 142) to train the ML model 410 to generate the investment instructions 450. The ML model 410 may be trained to generate the investment instructions 450 via a large language model, neural network, deep learning model, Transformer-based model, GPT, GAN, regression model, k-nearest neighbor algorithm, support vector regression algorithm, and/or random forest algorithm, although any type of applicable ML model/algorithm may be used, including training using one or more of supervised learning, unsupervised learning, semi-supervised learning, and/or reinforcement learning.

Once trained, the ML model 410 may perform operations on one or more data inputs to produce a desired data output. In one aspect, the ML model 410 may be loaded at runtime (e.g., by the MLOM 144) from a database (e.g., the database 126 of the server 105) to process the investment strategy 440 data input. The server, such as server 105, may obtain the investment strategy 440 and use it as an input to generate the investment instructions 450. In one aspect, the server may obtain the investment strategy 440 via the client device 102 (e.g., of the investor) via a website, the chatbot 150, or any other suitable user device. In one aspect, the chatbot 150 may generate follow up questions in response to the investment strategy 440 in order to gather additional information necessary for generating the investment instructions 450. In one aspect, the server may obtain the investment strategy 440 from a data store, e.g., database 126.

In one aspect, the investment strategy 440 may comprise unstructured text. For example, the investment strategy 440 may comprise freeform text typed by the investor and/or verbal statements spoken by the investor. In another aspect, the investment strategy 440 may comprise structured data. For example, the investment strategy 440 may comprise responses to questions (e.g., risk tolerance, classes of desired financial assets, identification of companies to invest in, monetary goal, deadline to achieve monetary goal, etc.) presented in a mobile application and/or website. The monetary goal may comprise reaching a specific balance, staying above a specified balance, maintaining a regular income from dividends, and/or reaching a specified rate of return. The investment strategy 440 may comprise standardized data fields (e.g., description of current investments, value of current investments, etc.).

Once the investment instructions 450 are generated by ML model 410, they may be provided to the client device 102 or to another user device for review by the investor. For example, the server 105 may provide the investment instructions 450 via a mobile app to mobile device, in an email, a website, via a chatbot (such as the chatbot 415), and/or in any other suitable manner. In one aspect, the server 105 and/or client device 102 may perform one or more financial transactions according to the investment instructions 450. The server 105 and/or client device 102 may have access to one or more brokerage accounts and/or savings accounts of the investor.

Generative AI/ML may enable a computer, such as the server 105, to use existing data (e.g., as an input and/or training data) such as text, audio, video, images, and/or code, among other things, to generate new content, such as personalized investment instructions customized for a user, via one or more models. Generative ML may include unsupervised and semi-supervised ML algorithms, which may automatically discover and learn patterns in input data. Once trained, e.g., via MLTM 142, a generative ML model may generate content as an output which plausibly may have been drawn from the original input dataset and may include the content in the customized presentation. In one aspect, an ML chatbot such as chatbot 150 may include one or more generative AI/ML models.

Some types of generative AI/ML may include generative adversarial networks (GANs) and/or transformer-based models. In one aspect, the GAN may generate images, visual and/or multimedia content from image and/or text input data. The GAN may include a generative model (generator) and discriminative model (discriminator). The generative model may produce an image which may be evaluated by the discriminative model and use the evaluation to improve operation of the generative model. The transformer-based model may include a generative pre-trained language model, such as the pre-trained language model used in training ML chatbot model 250 described herein. Other types of generative AI/ML may use the GAN, the transformer model, and/or other types of models and/or algorithms to generate: (i) realistic images from sketches, which may include the sketch and object category as input to output a synthesized image; (ii) images from text, which may produce images (realistic, paintings, etc.) from textual description inputs; (iii) speech from text, which may use character or phoneme input sequences to produce speech/audio outputs; (iv) audio, which may convert audio signals to two-dimensional representations (spectrograms) which may be processed using algorithms to produced audio; and/or (v) video, which may generate and convert video (i.e., a series of images) using image processing techniques and may include predicting what the next frame in the sequence of frames/video may look like and generating the predicted frame. With the appropriate algorithms and/or training, generative AI/ML may produce various types of multimedia output and/or content which may be incorporated into a customized presentation, e.g., via an AI and/or ML chatbot (or voice bot).

In one aspect, an enterprise may use the AI and/or ML chatbot, such as the trained chatbot 150, to generate one or more customized components of the customized presentation to walk an investor through the investment instructions 450. The trained ML chatbot may generate output such as images, video, slides (e.g., a PowerPoint slide), virtual reality, augmented reality, mixed reality, multimedia, blockchain entries, metaverse content, or any other suitable components which may be used in the customized presentation.

Once trained, the ML chatbot which may include on one more generative AI/ML models such as those described may be able to generate the customized presentation based upon one or more prompts, such as an identification of a user and a prompt for investment instructions. In response, the ML chatbot may generate audio/voice/speech, text, slides, and/or other suitable content which may be included in the customized presentation.

In one aspect, the chatbot 415 may use, access, be operably connected to and/or otherwise include one or more ML models 410 to generate a customized presentation of the investment instructions 450. The chatbot 415 may generate the customized presentation in response to receiving the investment strategy 340 as the input.

In one aspect, the training data 420 may include presentation style information such as images, text, phonemes, audio, or other types of data which may be used as inputs as discussed herein for training one or more AI/ML models to generate different types of presentation components. The training data 420 may include style information related to a particular style (e.g., fonts, logos, emblems, colors, etc.) an organization would like the customized presentation components to emulate. The training data 420 may include investor profile information which may affect customizing the presentation for a particular investor or organization, e.g., the sophistication level of a particular investor. While the example training data 420 includes indications of various types of data, this is merely an example for ease of illustration only. The training data 420 may include any data relevant to generating the customized presentation of the investment instructions 450.

At runtime to create the customized presentation, the ML module 405 may load one or more ML models 410 and/or chatbots 415 in a memory. The server 105 may obtain the investment strategy 440, e.g., as input from user device 102, as well as any other suitable manner of obtaining the investment strategy 440. In one aspect, the investor for whom the investment instructions 450 are being generated provides the investment strategy 440 via the chatbot 415, e.g., using a web interface. In another embodiment, the user uploads one or more files containing the investment strategy 440. The investment strategy 440 may be provided as an input to the one or more ML models 410 and/or chatbots 415. The one or more chatbots 415 and/or ML models 410 may employ one or more AI/ML models (e.g., SFT ML model, GAN, pre-trained language models, etc.) and/or algorithms (e.g., supervised learning, unsupervised learning, semi-supervised learning, and/or reinforcement learning) discussed herein to generate the customized presentation of the investment strategy 440. For example, an investor may provide the investment strategy 440 and request assistance with investing. One or more ML models 410 and/or chatbots 415 may generate the investment instructions 450 to use style information such as colors, fonts and/or logos associated with an investor and/or brokerage firm, among other things.

An organization may update and save in a memory, such as memory 122 and/or database 126 of server 105, training data 420. ML model 405 may use the updated training data 420 to retrain and/or fine tune the ML model 410 and/or chatbot 415. For example, the organization may create updated organization style information which may affect the look of newly generated investment instructions 450. Subsequently, one or more ML models 410 may be retrained (e.g., via MLTM 142) based upon updated training data 420.

Exemplary Computer System for Automated Investing

Figure 4B:
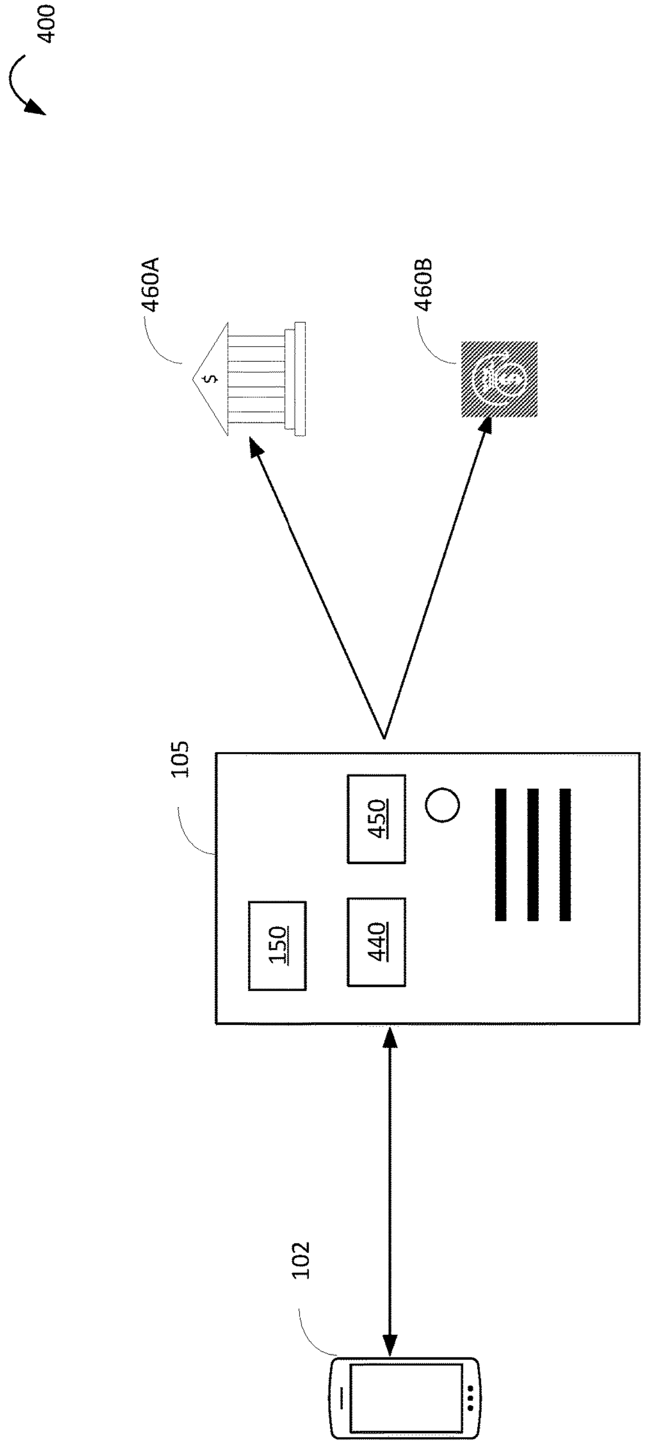
FIG. 4B depicts an exemplary environment in which methods and systems for automated investing may be performed.

FIG. 4B depicts an exemplary environment 400 in which methods and systems for automated investing may be performed, in accordance with various aspects discussed herein.

In one aspect, exemplary environment 400 may comprise one or more servers 105. The server 105 may comprise a chatbot 150. The server 105 may receive information via the chatbot 150. The server 105 may generate one or more requests for information via the chatbot 150. In one aspect, the chatbot 150 is an ML chatbot, although the chatbot 150 may be an AI chatbot, a voice bot and/or any other suitable chatbot/voice bot as described herein. The server 105 may select an appropriate chatbot based upon the method of communication with the investor.

In one aspect, the exemplary environment 400 may comprise one or more client devices 102 operated by investors. The client device 102 may comprise an application for communicating with the chatbot 150 over the Internet or any other suitable communication network. The client device 102 may comprise a telephone, such as a smartphone, for communicating with the chatbot 150 via a telephone call.

In one aspect, the client device 102 may provide an investment strategy 440 to the server 105. The client device 102 may transmit a complete investment strategy 440 to the server. The client device 102 may engage in an interactive communication with the chatbot 150 in which the investor provides information used by the server 105 to generate the investment strategy 440.

In one aspect, the server 105 may use one or ML models 410 to generate the investment instructions 450. The ML model 410 may use the training data 420 and/or the investment strategy 440 to generate the investment instructions 450. The chatbot 150 may provide the investment instructions 450 to the client device 102. The chatbot 150 may seek approval and/or feedback regarding the investment instructions 450 from the investor.

In one aspect, the server 105 may execute one or more financial transactions according to the investment instructions 450. The exemplary environment 400 may comprise one or more financial institutions 460A and 460B. For example, financial institution 460A may be a bank holding the investor's checking and/or savings accounts, and financial institution 460B may be a brokerage firm in what the investor has an account. The server 105 may log into one or more of the financial institutions 460A and 460B and perform financial transactions. For example, the server 105 may transfer a specified amount of money from a savings account at the financial institution 460A into a brokerage account at the financial institution 460B. The server 105 may then purchase one or more investments at the financial institution 460B.

In one aspect, the server 105 may periodically collect information from the financial institutions 460A and/or 460B, such as account balances. The server 105 may execute additional financial transactions at the financial institutions 460A and/or 460B based upon the collected information. For example, the server may attempt to rebalance the investments held at the financial institutions 460A and/or 460B.

Exemplary Computer-Implemented Method for Personalized Task Generation

Figure 5:
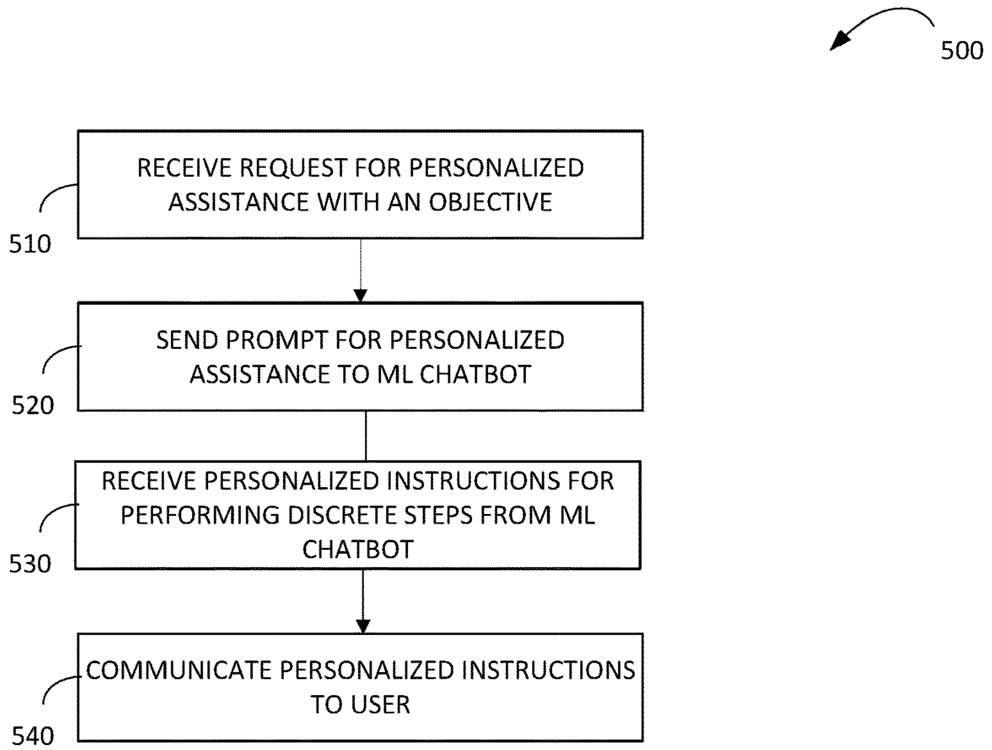
FIG. 5 depicts an exemplary computer-implemented method for personal planning.

FIG. 5 depicts a flow diagram of an exemplary computer-implemented method 500 for personalized task generation. One or more steps of the method 500 may be implemented as a set of instructions stored on a computer-readable memory and executable on one or more processors. The method 500 of FIG. 5 may be implemented via a system, such as the client device 102 and/or the server 105.

In one embodiment, the computer-implemented method 500 may include training an ML model (such as any of the ML models or modules 150, 310, or 410) with a training dataset (such as training data 420) and/or validating the ML model with a validation dataset. The training dataset and/or the validation dataset may comprise documents describing background information relating to one or more objectives.

In one embodiment, the computer-implemented method 500 may include at block 510 receiving from a user a request for personalized assistance with an objective. The request may be received via an application, web browser, chat session, and/or any other suitable medium. The request may include an identification of the user (e.g., full name, username, etc.). The objective may comprise a weight loss goal, retirement goal, filing an insurance claim, assessing an insurance claim, and/or any other suitable goal. The objective may comprise a completion deadline.

In one embodiment, the computer-implemented method 500 at block 520 may include sending a prompt for personalized assistance with the objective to the ML chatbot. The sending of the prompt may include an identification of the user. The prompt may be sent via a text message, application, e-mail, FTP, HTTP, HTTPS, and/or any other suitable communication method.

In one embodiment, the computer-implemented method 500 at block 530 may include receiving personalized instructions for performing one or more discrete steps of the objective from the ML chatbot. The personalized instructions may be received via a text message, application, e-mail, FTP, HTTP, HTTPS, and/or any other suitable communication method. The personalized instructions may include exercise steps, savings steps, investment steps, loss documentation steps, damage documentation steps, cost estimation steps, and/or any other suitable steps. The personalized instructions may include target dates for completing the steps.

In one embodiment, the computer-implemented method 500 at block 540 may include communicating the personalized instructions to the user. The personalized instructions may be communicated via an application, web browser, chat session, and/or any other suitable medium. The personalized instructions may comprise text, a stylized presentation, audio, and/or video.

In one embodiment, the computer-implemented method 500 may include receiving an authorization from the user to track the user's progress in completing the one or more discrete steps. The method 500 may include monitoring the progress of the user in completing the one or more discrete steps. The method 500 may include communicating the progress to the user.

In one embodiment, the computer-implemented method 500 may include sending the progress of the user and a prompt for updated discrete steps and/or a prompt for progress analysis to the ML chatbot. The method may include receiving updated personalized instructions for performing the updated discrete steps from the ML chatbot. The method may include receiving an alert from the ML chatbot that a target date will not be met. The method may include communicating the updated personalized instructions and/or the alert to the user.

It should be understood that not all blocks of the exemplary flow diagram 500 are required to be performed. Moreover, the exemplary flow diagram 500 is not mutually exclusive (i.e., block(s) from exemplary flow diagram 500 may be performed in any particular implementation).

Additional Considerations

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods may be illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments may be described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity that may be physically constructed, permanently configured (e.g., hardwired), or temporarily configured (e.g., programmed) to operate in a certain manner or to perform certain operations described herein. Considering embodiments in which hardware modules may be temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In some embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing." "calculating." "determining," "presenting." "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, yet still co-operate or interact with each other. The embodiments are not limited in this context.

As used herein, the terms "comprises," "comprising." "includes," "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality and improve the functioning of conventional computers.

What is claimed:

1. A computer system for personalized planning, the computer system comprising:
- one or more processors;
- a memory storing a machine learning (ML) chatbot comprising an ML model and executable instructions thereon that, when executed by the one or more processors, cause the one or more processors to:
- receive from a user a request for personalized assistance with an objective;
- retrieve, based upon an identification of the user, user profile data associated with the user;
- send the user profile data and a prompt for the personalized assistance with the objective to the ML chatbot to cause the ML model to:
  - divide the objective into one or more discrete steps, and
  - generate personalized instructions for performing the one or more discrete steps based upon the user profile data;
- receive the personalized instructions for performing the one or more discrete steps from the ML chatbot;
- generate, via the ML chatbot, a multimedia presentation of the personalized instructions; and
- communicate the multimedia presentation of the personalized instructions for performing the one or more discrete steps to the user.

2. The computer system of claim 1, wherein the user is an insurance policyholder, the objective comprises filing an insurance claim, and the personalized instructions comprise loss documentation steps.

3. The computer system of claim 1, wherein the user is an insurance claims adjuster, the objective comprises assessing an insurance claim, and the personalized instructions comprise damage documentation and cost estimation steps.

4. The computer system of claim 1, wherein the objective comprises a completion deadline and the personalized instructions comprise target dates for completing the one or more discrete steps.

5. The computer system of claim 1, wherein the instructions, when executed by the one or more processors, further cause the one or more processors to:
- receive an authorization from the user to track a progress of the user in completing the one or more discrete steps,
- monitor the progress of the user, and
- communicate the progress to the user.

6. The computer system of claim 5, wherein the instructions, when executed by the one or more processors, further cause the one or more processors to:
- send the progress of the user and a prompt for updated discrete steps to the ML chatbot to cause the ML model to revise the one or more discrete steps into one or more updated discrete steps and generate updated personalized instructions for performing the one or more updated discrete steps,
- receive the updated personalized instructions for performing the one or more updated discrete steps from the ML chatbot, and
- communicate the updated personalized instructions to the user.

7. The computer system of claim 5, wherein the instructions, when executed by the one or more processors, further cause the one or more processors to:
- send the progress of the user and a prompt for progress analysis to the ML chatbot to cause the ML model to generate an alert if the ML model determines, based upon the progress of the user, that a target date will not be met,
- receive the alert from the ML chatbot, and
- communicate the alert to the user.

8. A computer-implemented method for personalized planning, the computer-implemented method comprising:
- receiving from a user a request for personalized assistance with an objective;
- retrieving, based upon an identification of the user, user profile data associated with the user;
- sending the user profile data and a prompt for the personalized assistance with the objective to a machine learning (ML) chatbot to cause an ML model to;
  - divide the objective into one or more discrete steps, and
  - generate personalized instructions for performing the one or more discrete steps based upon the user profile data:
- receiving the personalized instructions for performing the one or more discrete steps from the ML chatbot;
- generating, via the ML chatbot, a multimedia presentation of the personalized instructions; and
- communicating the multimedia presentation of the personalized instructions for performing the one or more discrete steps to the user.

9. The computer-implemented method of claim 8, wherein the user is an insurance policyholder, the objective comprises filing an insurance claim, and the personalized instructions comprise loss documentation steps.

10. The computer-implemented method of claim 8, wherein the user is an insurance claims adjuster, the objective comprises assessing an insurance claim, and the personalized instructions comprise damage documentation and cost estimation steps.

11. The computer-implemented method of claim 8, wherein the objective comprises a completion deadline and the personalized instructions comprise target dates for completing the one or more discrete steps.

12. The computer-implemented method of claim 8 further comprising:

receiving an authorization from the user to track a progress of the user in completing the one or more discrete steps, monitoring the progress of the user, and communicating the progress to the user.

13. The computer-implemented method of claim 12 further comprising:

sending the progress of the user and a prompt for updated discrete steps to the ML chatbot to cause the ML model to revise the one or more discrete steps into one or more updated discrete steps and generate updated personalized instructions for performing the one or more updated discrete steps, receiving the updated personalized instructions for performing the one or more updated discrete steps from the ML chatbot, and communicating the updated personalized instructions to the user.

14. The computer-implemented method of claim 12 further comprising:

sending the progress of the user and a prompt for progress analysis to the ML chatbot to cause the ML model to generate an alert if the ML model determines, based upon the progress of the user, that a target date will not be met, receiving the alert from the ML chatbot, and communicating the alert to the user.

15. A non-transitory computer-readable storage medium storing a machine learning (ML) chatbot comprising an ML model and computer-readable instructions for personalized planning, wherein the instructions when executed on one or more processors cause the one or more processors to:

receive from a user a request for personalized assistance with an objective;

retrieve, based upon an identification of the user, user profile data associated with the user;

send the user profile data and a prompt for the personalized assistance with the objective to the ML chatbot to cause the ML model to;

divide the objective into one or more discrete steps, and generate personalized instructions for performing the one or more discrete steps based upon the user profile data:

receive the personalized instructions for performing the one or more discrete steps from the ML chatbot;

generate, via the ML chatbot, a multimedia presentation of the personalized instructions; and communicate the multimedia presentation of the personalized instructions for performing the one or more discrete steps to the user.

16. The non-transitory computer-readable storage medium of claim 15, wherein the user is an insurance policyholder, the objective comprises filing an insurance claim, and the personalized instructions comprise loss documentation steps.

17. The non-transitory computer-readable storage medium of claim 15, wherein the user is an insurance claims adjuster, the objective comprises assessing an insurance claim, and the personalized instructions comprise damage documentation and cost estimation steps.

18. The non-transitory computer-readable storage medium of claim 15, wherein the objective comprises a completion deadline and the personalized instructions comprise target dates for completing the one or more discrete steps.

19. The non-transitory computer-readable storage medium of claim 15, wherein the instructions, when executed by the one or more processors, further cause the one or more processors to:

receive an authorization from the user to track a progress of the user in completing the one or more discrete steps, monitor the progress of the user, and communicate the progress to the user.

20. The non-transitory computer-readable storage medium of claim 19, wherein the instructions, when executed by the one or more processors, further cause the one or more processors to:

send the progress of the user and a prompt for updated discrete steps to the ML chatbot to cause the ML model to revise the one or more discrete steps into one or more updated discrete steps and generate updated personalized instructions for performing the one or more updated discrete steps, receive the updated personalized instructions for performing the one or more updated discrete steps from the ML chatbot, and communicate the updated personalized instructions to the user.

* * * * *